(12) United States Patent
Cui

(10) Patent No.: US 10,970,859 B2
(45) Date of Patent: Apr. 6, 2021

(54) MONITORING METHOD AND DEVICE FOR MOBILE TARGET, MONITORING SYSTEM AND MOBILE ROBOT

(71) Applicants: ANKOBOT (SHENZHEN) SMART TECHNOLOGIES CO., LTD., Shenzhen (CN); ANKOBOT (SHANGHAI) SMART TECHNOLOGIES CO., LTD., Shanghai (CN)

(72) Inventor: Yuwei Cui, Shanghai (CN)

(73) Assignees: ANKOBOT (SHENZHEN) SMART TECHNOLOGIES CO., LTD., Shenzhen (CN); ANKOBOT (SHANGHAI) SMART TECHNOLOGIES CO., LTD., Shanghai (CN)

( * ) Notice: Subject to any disclaimer, the term of this patent is extended or adjusted under 35 U.S.C. 154(b) by 58 days.

(21) Appl. No.: 16/522,717

(22) Filed: Jul. 26, 2019

(65) Prior Publication Data
US 2020/0184658 A1    Jun. 11, 2020

Related U.S. Application Data

(63) Continuation of application No. PCT/CN2018/119293, filed on Dec. 5, 2018.

(51) Int. Cl.
*G06T 7/292* (2017.01)
*B25J 9/16* (2006.01)
(Continued)

(52) U.S. Cl.
CPC ............. *G06T 7/292* (2017.01); *B25J 9/1697* (2013.01); *G06K 9/4604* (2013.01); *G06N 3/08* (2013.01); *G06T 7/285* (2017.01)

(58) Field of Classification Search
CPC ................ G06T 7/292; G06T 7/285; G06T 2207/30232; G06T 7/33; G06T 7/254;
(Continued)

(56) References Cited

U.S. PATENT DOCUMENTS 10,509,413 B2 * 12/2019 Mou .................... G05D 1/0278
2015/0329217 A1 * 11/2015 Kirk .................... G08G 5/0078
701/301

(Continued)

FOREIGN PATENT DOCUMENTS

CN          101303732 A      11/2008
CN          102074022 A       5/2011
(Continued)

OTHER PUBLICATIONS

Dongcheng Shi et. al. , Movoing object detection based on scene knowledge. vol. 43 p. 275, Mar. 2013, Journal of Jilin University (Engineering and Technology Edition.
(Continued)

*Primary Examiner* — Jerome Grant, II
(74) *Attorney, Agent, or Firm* — IPro, PLLC

(57) ABSTRACT

The present application provides a monitoring method and device for a mobile target, a monitoring system and mobile robot. The present application through the technical solution that acquiring multiple-frame images captured by an image acquisition device under an moving state of a robot in a monitored region, selecting at least two-frame images with an overlapped region from the multiple-frame images, performing comparison between the selected images by image compensation method or feature matching method, and outputting monitoring information containing a mobile target which moves relative to a static target based on the result of comparison, wherein the position of the mobile target has an attribute of indefinite change, the mobile target in the
(Continued)

monitored region can be recognized precisely during movement of the mobile robot, and monitoring information about the mobile target can be generated to prompt correspondingly, thereby safety of the monitored region can be effectively ensured.

8 Claims, 7 Drawing Sheets

(51) Int. Cl.
    *G06N 3/08*     (2006.01)
    *G06T 7/285*     (2017.01)
    *G06K 9/46*     (2006.01)

(58) Field of Classification Search
CPC ............ G06T 7/246; G06T 2207/10016; B25J 9/1697; G06N 3/08; G06K 9/4604; G06K 9/6211; G06K 2209/21; G06K 9/00664; G06K 9/00724; G06K 9/00744; G06K 9/00758; H04L 67/06; H04N 5/144; H04N 7/18
USPC .......................................................... 382/103
See application file for complete search history.

(56) References Cited

U.S. PATENT DOCUMENTS

| | | | |
|---|---|---|---|
| 2017/0039765 A1* | 2/2017 | Zhou | G06T 7/55 |
| 2017/0148138 A1 | 5/2017 | Liu et al. | |
| 2017/0213078 A1* | 7/2017 | Guerrini | G06T 7/254 |
| 2018/0047267 A1* | 2/2018 | Modestine | G08B 13/19695 |
| 2018/0150718 A1* | 5/2018 | Omari | G06K 9/4671 |
| 2019/0051193 A1* | 2/2019 | Gutierrez | G08G 5/0069 |
| 2019/0064362 A1* | 2/2019 | Scott | G01S 13/885 |
| 2019/0078876 A1* | 3/2019 | Ouchida | G06T 1/0007 |
| 2019/0138801 A1* | 5/2019 | Psota | G06T 7/60 |
| 2020/0068126 A1* | 2/2020 | Fink | H04N 5/247 |

FOREIGN PATENT DOCUMENTS

| | | | |
|---|---|---|---|
| CN | 103149939 A | 6/2013 | |
| CN | 103984315 A | 8/2014 | |
| CN | 105374031 A | 3/2016 | |
| CN | 105447888 A | 3/2016 | |
| CN | 106056625 A | 10/2016 | |
| CN | 106682619 A | 5/2017 | |
| CN | 106846367 A | 6/2017 | |
| CN | 108806142 A | 11/2018 | |
| JP | 107092926 * | 8/2017 | ............. G06K 9/62 |
| WO | 2009031751 A1 | 3/2009 | |

OTHER PUBLICATIONS

PCT/CN2018/119293 ISR ISA210 and ISA237, dated Sep. 2, 2019.

\* cited by examiner

MONITORING METHOD AND DEVICE FOR MOBILE TARGET, MONITORING SYSTEM AND MOBILE ROBOT

RELATED APPLICATION

This application is a continuation application of International Patent Application No. PCT/CN2018/119293, filed Dec. 5, 2018, the entire contents of which are hereby incorporated by reference.

TECHNICAL FIELD

The present application relates to the field of intelligent mobile robots, in particular to a monitoring method and device for a mobile target, a monitoring system and a mobile robot.

BACKGROUND

Nowadays, the world has entered a critical period of reform and development as well as social transformations. Unprecedented social changes, such as profound changes of economic systems, rapid transformations of social structures, accelerated adjustment of benefit patterns, rapid changes of views and values, and great increase in floating populations, have brought tremendous vitality to social development of the world, meanwhile, various security risks have also emerged, and a dramatic change in public security has also put enormous pressure on social security.

In order to ensure security of home environments, many people now consider to install an anti-theft system in their home, and the existing manners for anti-theft mainly include protection by means of persons and protection by means of objects (for example, anti-theft doors, iron barriers, etc.). Under some conditions, the following security ways are also used at home: installing an infrared ray anti-theft alarming device, installing electromagnetic password lock or installing monitoring camera at home. The above anti-theft manners are fixed and obvious, these monitoring devices cannot accurately detect moving targets which illegally invade, and those who break in illegally may easily evade monitoring of these anti-theft devices, therefore, reliable, effective and flexible security cannot be provided.

SUMMARY

In view of the above shortcomings in the prior art, an objective of the present application is to provide a monitoring method and device for a mobile target, a monitoring system and a mobile robot, so as to solve the problem in the prior art that a mobile target cannot be detected effectively and accurately during the movement of a robot.

In one aspect, the present application provides a monitoring device for a mobile target. The monitoring device is used in a mobile robot, and comprises a movement device and an image acquisition device, wherein, the monitoring device for a mobile target comprises: at least one processing device; at least one storage device, configured to store images captured by the image acquisition device under an operating state of the movement device; at least one program, wherein the at least one program is stored in the at least one storage device, and is invoked by the at least one processing device such that the monitoring device performs a monitoring method for a mobile target; the monitoring method for a mobile target comprises the following steps: acquiring multiple-frame images captured by the image acquisition device under the operating state of the movement device; and outputting monitoring information containing a mobile target which moves relative to a static target according to a result of performing comparison between at least two-frame images selected from the multiple-frame images; wherein the at least two-frame images are images captured by the image acquisition device within partially overlapped field of view, and a position of the mobile target in each of the at least two-frame images has an attribute of indefinite change.

In some embodiments, the step of performing comparison between at least two-frame images selected from the multiple-frame images comprises the following steps: detecting a suspected target based on the comparison between the at least two-frame images; and tracking the suspected target to determine the mobile target.

In some embodiments, the step of detecting a suspected target according to the comparison between the at least two-frame images comprises the following steps: performing image compensation on the at least two-frame images based on movement information of the movement device within a time period between the at least two-frame images; and performing subtraction processing on the compensated at least two-frame images to form a difference image, and detecting the suspected target from the difference image.

In some embodiments, the step of performing comparison between at least two-frame images selected from the multiple-frame images comprises the following steps: detecting a suspected target based on a matching operation on corresponding feature information in the at least two-frame images; and tracking the suspected target to determine the mobile target.

In some embodiments, the step of detecting a suspected target based on a matching operation on corresponding feature information in the at least two-frame images comprises the following steps: extracting each feature point in the at least two-frame images respectively, and matching extracted each feature point in the at least two-frame images with a reference three-dimensional coordinate system; wherein the reference three-dimensional coordinate system is formed through performing three-dimensional modeling on a mobile space, and the reference three-dimensional coordinate system is marked with coordinate of each feature point on all static targets in the mobile space; and detecting a feature point set as the suspected target, the feature point set is composed of feature points in the at least two-frame images that are not matched with the reference three-dimensional coordinate system.

In some embodiments, the step of tracking the suspected target to determine the mobile target comprises the following steps: obtaining a moving track of a suspected target through tracking the suspected target; and determining the suspected target as the mobile target when the moving track of the suspected target is continuous.

In some embodiments, the step of tracking the suspected target to determine the mobile target comprises the following steps: obtaining a moving track of a suspected target through tracking the suspected target; and determining the suspected target as the mobile target when the moving track of the suspected target is continuous.

In some embodiments, the monitoring method further comprises the following steps: performing object recognition on the mobile target in the captured images, wherein the object recognition is performed by an object recognizer, the object recognizer includes a trained neural network; and outputting the monitoring information according to result of the object recognition.

In some embodiments, the monitoring method further comprises the following steps: uploading captured images or videos containing images to a cloud server to perform object recognition on the mobile target in the image; wherein the cloud server includes an object recognizer which includes trained neural networks; and receiving a result of object recognition from the cloud server and outputting the monitoring information.

In some embodiments, the monitoring information comprises one or more of image information, video information, audio information and text information.

In another aspect, the present application provides a mobile robot. The mobile robot comprises a movement device, configured to control movement of the mobile robot according to received control instruction; an image acquisition device, configured to capture multiple-frame images under an operating state of the movement device; and the monitoring device mentioned above.

In another aspect, the present application provides a monitoring system. The monitoring system comprises: a cloud server; and a mobile robot, connected with the cloud server; wherein the mobile robot performs the following steps: acquiring multiple-frame images during movement of the mobile robot; outputting detection information containing a mobile target which moves relative to a static target according to a result of performing comparison between at least two-frame images selected from the multiple-frame images; uploading the captured images or videos containing images to the cloud server based on the detection information; and outputting monitoring information based on a result of object recognition received from the cloud server; or, wherein the mobile robot performs the following steps: acquiring multiple-frame images during movement of the mobile robot, and uploading the multiple-frame images to the cloud server; and the cloud server performs the following steps: outputting detection information containing a mobile target which moves relative to a static target according to a result of performing comparison between at least two-frame images selected from the multiple-frame images; and outputting an object recognition result of the mobile target to the mobile robot according to a result of performing object recognition on the mobile target in multiple-frame images, such that the mobile robot outputs monitoring information.

As mentioned above, the monitoring method and device for a mobile target, the monitoring system and mobile robot of the present application have the following beneficial effects: through the technical solution that acquiring multiple-frame images captured by an image acquisition device under an moving state of a robot in a monitored region, selecting at least two-frame images with an overlapped region from the multiple-frame images, performing comparison between the selected images by image compensation method or feature matching method, and outputting monitoring information containing a mobile target which moves relative to a static target based on the result of comparison, and wherein the position of the mobile target in each of the at least two-frame images has an attribute of indefinite change, the mobile target in the monitored region can be recognized precisely during movement of the mobile robot, and monitoring information about the mobile target can be generated to prompt correspondingly, thereby safety of the monitored region can be effectively ensured.

DETAILED DESCRIPTION

Figure 1:
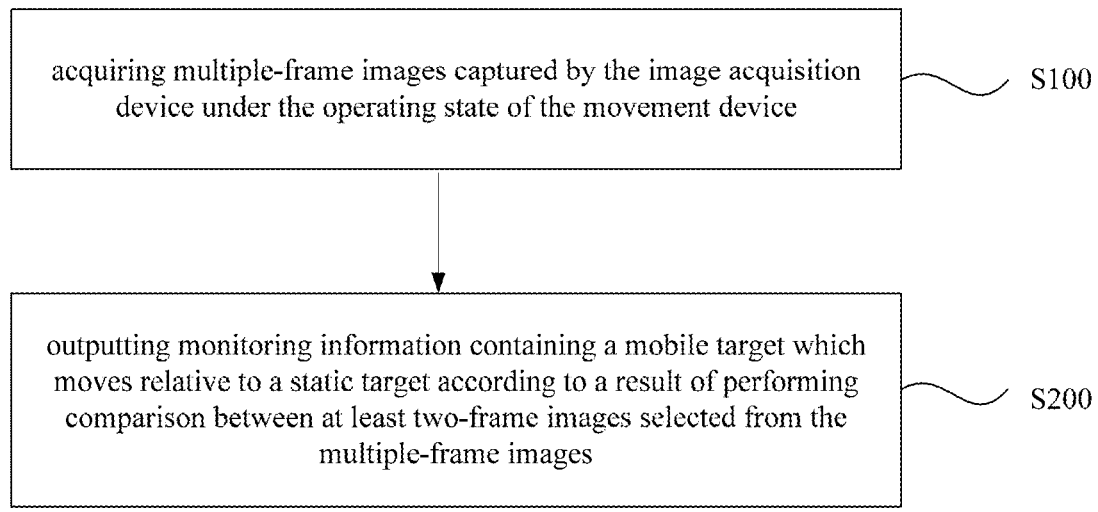
FIG. 1 shows a flow diagram of a monitoring method for a mobile target of the present application in one embodiment.

Implementations of the present application will be described below through specific embodiments, and those skilled in the art can easily understand other advantages and effects of the present application from the contents disclosed in the present specification.

In the following description, several embodiments of the present application are described with reference to the attached figures. It should be understood that other embodiments may also be used, and changes of mechanical composition, structure, electric and operation may be made without departing from the spirit and scope of this application. The following detailed description should not be considered restrictive, and the scope of the implementation of this application is limited only by the published patent claims. The terminology used herein is intended only to describe specific embodiments and is not intended to restrict this application. Spatial terms, such as "up", "down", "left", "right", "lower part", "higher part", "bottom", "below", "above", "upwards", etc., can be used in this application to illustrate the relationship between one element and another or one feature and another shown in the figure.

Moreover, as used herein, such single forms as "one", "a" and "the" aim at also including the plural forms, unless contrarily indicated in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

In order to ensure security of family environments, many people now consider to install an anti-theft system at home. The existing manners for anti-theft mainly include protection by means of persons and protection by means of objects (for example, anti-theft doors, iron barriers, etc.). Under some conditions, the following security ways are also used at home: installing an infrared ray anti-theft alarming devices, installing electromagnetic password locks or installing monitoring cameras at home. The above anti-theft manners are fixed and obvious, and those who break in illegally may easily evade monitoring of these anti-theft devices, therefore, reliable and effective security cannot be provided.

Mobile robots perform mobile operations based on navigation control technology. Affected by the situation of mobile robots, when they are in an unknown location of an unknown environment, mobile robots build maps and perform navigation operations based on V SLAM (Visual Simultaneous Localization and Mapping) technology. Specifically, mobile robots construct maps through visual information provided by visual sensors and mobile information provided by position measurement devices, and navigate and move independently based on the map. Wherein, the visual sensors include, for example, a camera device. The position measurement devices for example include speed sensor, odometer sensor, distance sensor, cliff sensor, etc. The mobile robot moves on the plane where it moves (i.e. moving plane), acquiring and storing images that entity objects projected onto the moving plane. The image acquisition device captures entity objects in the field of view at the location of the mobile robot and projects them to the moving plane, so as to obtain the projection images. The entity objects include, for example, a TV set, an air conditioner, a chair, shoes, a leather ball, etc. In the existing practical applications, the mobile robot determines the current position by the position information provided by the position measurement device, and also by identifying image features contained in the images captured by the image acquisition device, through comparing image features captured at the current position with image features stored in the map.

The mobile robot is, for example, a security robot. After the security robot is started, a region where security protection is needed can be traversed according to a determined or random route. For the existing security robot, all the captured images are generally uploaded to a monitoring center, and a suspected object in the captured image cannot be prompted based on the situation, therefore, the security robot is not intelligent enough.

In view of this, the present application provides a monitoring method for a mobile target used in a mobile robot. The mobile robot comprises a movement device and an image acquisition device, and the monitoring method can be performed by a processing device contained in the mobile robot. Wherein the processing device is an electronic device which is capable of performing numeric calculation, logical calculation and data analysis, and the processing device includes but is not limited to: CPU, GPU and FPGA, and volatile memory configured to temporarily store intermediate data generated during calculation. In the monitoring method, monitoring information containing a mobile target which moves relative to a static target is output through comparing at least two-frame images selected from multiple-frame images captured by an image acquisition device, wherein the multiple-frame images are captured by the image acquisition device under an operating state of the movement device. The static target for example includes but is not limited to: ball, shoe, wall, flowerpot, cloth and hat, roof, lamp, tree, table, chair, refrigerator, television, sofa, sock, tiled object, and cup. Wherein, the tiled object includes but is not limited to ground mat or floor tile map paved on the floor, and tapestry and picture hung on a wall. The mobile robot can be for example a specific security robot, and the security robot monitors a monitored region according to the monitoring method of a mobile target in the present application. In some other embodiments, the mobile robot can also be other mobile robot which contains a module configured to perform the monitoring method of a mobile target in the present application. The other mobile robot for example is a cleaning robot, a mobile robot accompanying family members or a robot for cleaning glass. For example, when the mobile robot is a cleaning robot, it can traverse the whole to-be-cleaned region according to a map constructed in advance using VSLAM technique and in combination with the image acquisition device of the cleaning robot. While the cleaning robot is enabled to start cleaning operations, a module which is possessed by the cleaning robot and which carries the monitoring method for a mobile target of the present application is started at the same time, thereby monitoring security while cleaning. The movement device for example includes wheels and drivers of the wheels, wherein the driver can be for example a motor. The movement device is used to drive the robot to move back and forth in a reciprocating manner, move in a rotational manner or move in a curvilinear manner according to a planned moving track, or to drive the mobile robot to adjust a pose.

Herein, the mobile robot at least includes an image acquisition device. The image acquisition device captures images within a field of view at a position where the mobile robot is located. For example, a mobile robot includes an image acquisition device which is arranged on the top, shoulder or back of the mobile robot, and the principal optic axis of the image acquisition device is vertical to a moving plane of the mobile robot, or the principal optic axis is consistent with a travelling direction of the mobile robot. In some other embodiments, the principal optic axis can also be set to form a certain angle (for example, an angle between 50° and 86°) with the moving plane on which the mobile robot is located, to acquire a greater image acquisition range. In other embodiments, the principal optic axis of the image acquisition device can also be set in many other ways, for example, the image acquisition device can rotate according to a certain rule or rotate randomly, in this case, an angle between the optic axis of the image acquisition device and a travelling direction of the mobile robot is constantly changed, therefore, installation manners of the image acquisition device and states of the principal optic axis of the image acquisition device are not limited to what are enumerated in the present embodiment. For another example, the mobile robot includes two or more image acquisition devices, for example, a binocular image acquisition device or a multi-image acquisition devices. For two or more image acquisition devices, the principal optic axis of one image acquisition device is vertical to moving plane of the mobile robot, or the principal optic axis is consistent with a travelling direction of the mobile robot. In some other embodiments, the principal optic axis can also be set to form a certain angle with the moving plane, so as to acquire a greater image acquisition range. In other embodiments, the principal optic axis of the image acquisition device can also be set in many other ways, for example, the image acquisition device can rotate according to a certain rule or rotate randomly, in this case, an angle between the optic axis of the image acquisition device and a travelling direction of the mobile robot is constantly changed, therefore, installation manners of the image acquisition device and states of the principal optic axis of the image acquisition device are not limited to what are enumerated in the present embodiment. The image acquisition device includes but is not limited to: fisheye camera module, wide angle (or non-wide angle) camera module, depth camera module, camera module integrated with an optical system or CCD chip, and camera module integrated with an optical system and CMOS chip.

The power supply system of the image acquisition device can be controlled by the power supply system of the mobile robot, and during the period that the mobile robot is powered on and moves, the image acquisition device begins to capture images.

Please refer to FIG. 1 which shows a flow diagram of the monitoring method of a mobile target of the present application in one embodiment. As shown in FIG. 1, the monitoring method of the mobile target includes the following steps:

Step S100: multiple-frame images are captured by an image acquisition device under an operating state of the movement device. In an embodiment where the mobile robot is a cleaning robot, a movement device of the mobile robot can include a travelling mechanism and a travelling drive mechanism, wherein the travelling mechanism can be arranged at a bottom of the robot body, and the travelling drive mechanism is arranged inside the robot body. The travelling mechanism can for example include a combination of two straight-going walking wheels and at least one auxiliary steering wheel, wherein the two straight-going walking wheels are respectively arranged at two opposite sides at a bottom of the robot body, and the two straight-going walking wheels can be independently driven by two corresponding travelling drive mechanisms respectively, that is, a left straight-going walking wheel is driven by a left travelling drive mechanism, while a right straight-going walking wheel is driven by a right travelling drive mechanism. The universal walking wheel or the straight-going walking wheel can be provided with a bias drop suspension system which is fixed in a movable manner, for example, the bias drop suspension system can be installed on a robot body in a rotatable manner and receives spring bias which is downwards and away from the robot body. The spring bias enables the universal walking wheel or the straight-going walking wheel to maintain contact and traction with the ground with a certain landing force. In practical applications, under the condition that the at least one auxiliary steering wheel does not work, the two straight-going walking wheels are mainly used for going forward and backward, while when the at least one auxiliary steering wheel participates and matches with the two straight-going walking wheels, movements such as steering and rotating can be realized. The travelling drive mechanism can include a drive motor and a control circuit configured to control the drive motor, and the drive motor can be used to drive the walking wheels in the travelling mechanism to move. In specific implementations, the drive motor can be for example a reversible drive motor, and a gear shift mechanism can be further arranged between the drive motor and the axle of a walking wheel. The travelling drive mechanism can be installed on the robot body in a detachable manner, thereby facilitating disassembly and maintenance. In the present embodiment, the mobile robot which is a cleaning robot captures multiple-frame images when moving, in other words, in step S100, the processing device acquires multiple-frame images captured by the image acquisition device under an operating state of the movement device. In the embodiment, the multiple-frame images can be for example multiple-frame images acquired in a continuous time period, or multiple-frame images acquired within two or more discontinuous time periods.

Step S200: monitoring information containing a mobile target which moves relative to a static target is output according to a result of performing comparison between at least two-frame images selected from the multiple-frame images; wherein the at least two-frame images are images captured by the image acquisition device within partially overlapped field of view. In the present embodiment, a processing device of the mobile robot outputs monitoring information containing a mobile target which moves relative to a static target according to a result of performing comparison between at least two-frame images selected from the multiple-frame images.

In some embodiments, the static target for example includes but is not limited to: ball, shoe, wall, flowerpot, cloth and hat, roof, lamp, tree, table, chair, refrigerator, television, sofa, sock, tiled object, and cup. Wherein, the tiled object includes but is not limited to ground mat or floor tile map paved on the floor, and tapestry and picture hung on a wall.

Wherein, in step S200, the two-frame images selected by the processing device are images captured by the image acquisition device in a partially overlapped field of view, that is, the processing device determines to select a first frame image and a second frame image on the basis that the two-frame images contain an image overlapped region, and the overlapped field of view contains a static target, so as to monitor a mobile target which moves relative to the static target in the overlapped field of view. In order to ensure effectiveness of compared results between the selected two-frame images, the proportion of the image overlapped region in the first frame image and in the second frame image can also be set, for example, the proportion of the image overlapped region in the first frame image and in the second frame image are respectively at least 50% (but the proportions are not limited to this proportion, different proportions of the first frame image and the second frame image can be set depending on the situation). The selection of the first frame image and the second frame image should be continuous to some extent, and while ensuring that the first frame image and the second frame image have a certain proportion of an image overlapped region, the continuity of the moving track of the mobile target can be judged based on acquired images. Several manners of selecting the image will be enumerated below, the image selection methods described in the examples are merely some specific manners, and the manners of selecting the first frame image and the second frame image in practical applications are not limited to image selection methods herein, while other image selection manners which can ensure that selected two-frame images are relatively continuous and have an image overlapped region with a set proportion can all be applied to the present application.

In some implementations, the processing device respectively selects a first frame image and a second frame image at a first position and a second position, wherein, the image acquisition device has an overlapped field of view at the first position and the second position.

For example, the image acquisition device can capture videos, since videos are composed of image frames, during the movement period of the mobile robot, the processing device can continuously or discontinuously collect image frames in the acquired videos to obtain multiple-frame images, and select the first frame image and the second frame image according to a preset number of frame intervals, wherein the two-frame images have a partially overlapped region, and then the processing device performs image comparison between selected two-frame images.

For another example, during the movement period of the mobile robot, the processing device can preset time intervals at which an image acquisition device captures images, and acquire multiple frame-images captured by the image acquisition device at different time. In multiple-frame images, two-frame images are selected for comparison, and the time interval should be at least smaller than the time taken by the mobile robot in moving in one field of view, to ensure that two-frame images selected in the multiple-frame images have a partially overlapped part.

For another example, the mobile robot captures images within the field of view of the image acquisition device at a preset time interval, and then the processing device acquires images, and selects two of the images as a first frame image and a second frame image, wherein the two-frame images have a partially overlapped part. Wherein the time period can be represented by a time unit, or the time period can be represented by number of intervals of image frames.

For another example, the mobile robot is in communication with an intelligent terminal, and the intelligent terminal can modify the time period through a specific APP (applications). For example, after the APP is opened, a modification interface of the time period is displayed on a touch screen of the intelligent terminal, and the time period is modified through a touch operation on the modification interface; or a time period modification instruction is directly sent to the mobile robot to modify the time period. The time period modification instruction can be for example a voice containing modification instructions, the voice can be for example "the period is modified to be three seconds". For another example, the voice can be "the number of image frame intervals can be modified to be five".

In step S200, the position of the mobile target in each of at least two-frame images has an attribute of indefinite change. In some embodiments, the mobile robot moves, through the movement device, based on a map which is constructed in advance, and the image acquisition device captures multiple-frame images in the movement process. The processing device selects two-frame images from the multiple-frame images for comparison, the selected two-frame images are respectively a first frame image and a second frame image according to the order of the image selection. A corresponding position at which the mobile robot acquires the first frame image is the first position, while a corresponding position at which the mobile robot acquires the second frame image is a second position. The two-frame images have an image overlapped region, and a static target exists in the overlapped field of view of the image acquisition device. Since the mobile robot is under a moving state, the position of the static target in the second frame image has changed definitely relative to the position of the static target in the first frame image, the definite change amplitude of positions of the static target in the two-frame images has correlation with movement information of the mobile robot at the first position and the second position, and the movement information can be for example moving distance and pose change information of the mobile robot from the first position to the second position. In some embodiments, the mobile robot contains a position measurement device, which can be used to acquire movement information of the mobile robot, and relative position information between the first position and the second position can be measured according to the movement information.

The position measurement device includes but is not limited to a displacement sensor, a ranging sensor, a cliff sensor, an angle sensor, a gyroscope, a binocular image acquisition device and a speed sensor, which are arranged on a mobile robot. During the movement of the mobile robot, the position measurement device constantly detects movement information and provides it to the processing device. The displacement sensor, the gyroscope, the speed sensor and so on can be integrated into one or more chips. The ranging sensor and the cliff sensor can be set at the side of the mobile robot. For example, the ranging sensor in a cleaning robot is set at the edge of the housing; and the cliff sensor in a cleaning robot is arranged at the bottom of the mobile robot. According to the type and number of sensors arranged on a mobile robot, the movement information acquired by the processing device includes but is not limited to displacement information, angle information, information about distance between the robot and an obstacle, velocity information and travelling direction information. For example, the position measurement device is a counting sensor arranged on a motor of the mobile robot, the rotation number that the motor operates is counted so as to acquire relative displacement of the mobile robot from the first position to the second position, and an angle at which the motor operates is used to acquire pose information, etc.

In some other embodiments, taking a grid map as an example, a mapping relationship between a unit grid length and actual displacement is determined in advance. The number of grids that the mobile robot moves from a first position to a second position is determined based on the movement information obtained during movement of the mobile robot, and further relative position information between the first position and the second position is acquired.

Taking the map which is constructed in advance being a vector map as an example, a mapping relationship between a unit vector length and actual displacement is determined beforehand, the vector length that the mobile robot moves from the first position to the second position is determined according to movement information obtained during the movement of the mobile robot, and further relative position information of the two positions is obtained. The vector length can be calculated in pixel. Moreover, relative to the position of the static target in the first frame image, the position of the static target in the second frame image is shifted by a vector length which corresponds to the relative position information, therefore, the movement of the static target captured in the second frame image relative to the static target captured in the first frame image can be determined based on the relative position information of the mobile robot, thereby having an attribute of definite change. The movement of the mobile target in the selected two-frame images in the overlapped field of view does not conform to the above attribute of definite change.

Figure 2:
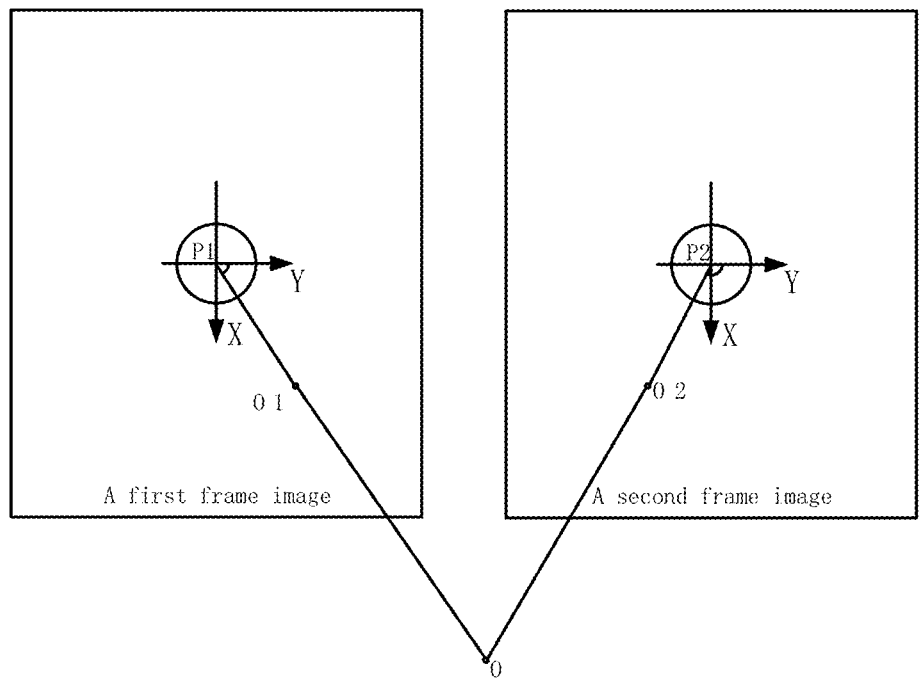
FIG. 2 shows image diagrams of selected two-frame images in one embodiment of the present application.

Please refer to FIG. 2 which shows image diagrams of selected two-frame images in one embodiment of the present application. In the present embodiment, the principal optic axis of the image acquisition device is set to be vertical to a moving plane, then the plane on which a two-dimensional image captured by an image acquisition device is located is in parallel with the moving plane of the mobile robot. In this setting manner, the position of an entity object in a projected image captured by the image acquisition device can be used to indicate the position where the entity object is projected onto the moving plane of the mobile robot, and the angle of the position of the entity object in a projected image relative to a travelling direction of the mobile robot is used to indicate the angle of the position at which the entity object is projected onto the moving plane of the mobile robot relative to the travelling direction of the mobile robot. The selected two-frame images in FIG. 2 are respectively a first frame image and a second frame image, the corresponding position at which the mobile robot acquires the first frame image is the first position P1, and the corresponding position at which the mobile robot acquires the second frame image is the second position P2. In the present embodiment, when the mobile robot moves from the first position P1 to the second position P2, only the distance is changed, but no pose is changed. Therefore, relative position information of the mobile robot at the first position P1 and the second position P2 can be acquired only by measuring relative displacement between the first position P1 and the second position P2. The two-frame images have an image overlapped region, and a static target O as shown in FIG. 2 exists in the overlapped field of view of the image acquisition device. Since the mobile robot is under a moving state, the position of the static target O in the second frame image is changed definitely relative to the position of the static target O in the first frame image, and the definite change amplitude of the position of the static target O in the two-frame images has correlation with movement information of the mobile robot at the first position P1 and the second position P2, and in the present embodiment, the movement information can be for example a movement distance when the mobile robot moves from the first position P1 to the second position P2. In the present embodiment, the mobile robot includes a position measurement device, and movement information of the mobile robot is acquired by the position measurement device of the mobile robot. For another example, the position measurement device measures a moving speed of the mobile robot, and calculates a relative displacement from the first position to the second position based on the moving speed and moving time. In some other embodiments, the position measurement device is a GPS system (Global Positioning System), and relative position information between the first position P1 and the second position P2 is acquired according to localization information of the GPS in the first position and the second position. As shown in FIG. 2, a projection of the static target O in the first frame image is a static target projection O1, and a projection of the static target O in the second frame image is a static target projection O2, and it can be clearly seen from FIG. 2 that, the position of static target projection O1 in the first frame image is changed to the position of the static target projection O2 in the second frame image, the positions have been changed, and changes in distance of the static target projection O2 relative to the static target projection O1 in the images is in a certain proportion to the relative displacement between the first position P1 and the second position P2, and the changes in distance of the static target projection O2 relative to the static target projection O1 in images can be definitely acquired according to a ratio of unit actual distance to a pixel in the image. Therefore, the movement of a static target captured in a second frame image relative to the static target captured in a first frame image can be determined based on relative position information of the mobile robot, which has an attribute of definite change. While the movement of the mobile target in the overlapped field of view in the selected two-frame images does not conform to the above attribute of definite change.

In some other embodiments, the position measurement device is a device which performs localization based on measured wireless signals, for example, the position measurement device is a bluetooth (or WiFi) localization device. The position measurement device determines relative position of the first position P1 and the second position P2 relative to a preset wireless locating signal transmitting device respectively by measuring power of received wireless locating signals at the first position P1 and the second position P2, thereby relative position information between the first position P1 and the second position P2 is acquired.

Figure 3:
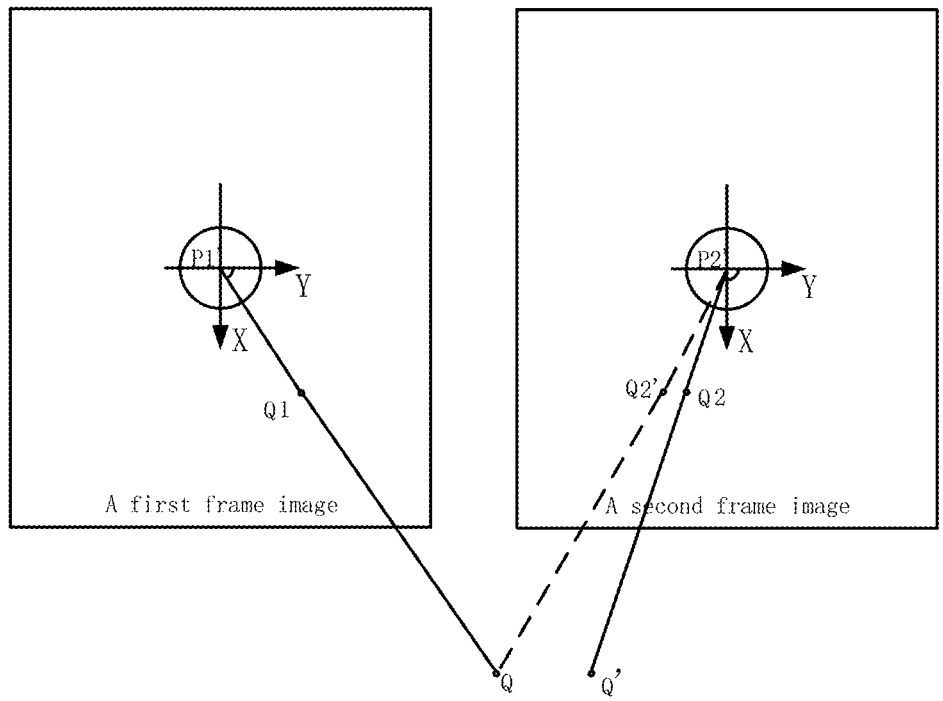
FIG. 3 shows image diagrams of selected two-frame images in another embodiment of the present application.

During the movement of a mobile robot, when a mobile target exists in a captured first frame image and second frame image, the movement of the mobile target has an attribute of indefinite change. Please refer to FIG. 3 which shows image diagrams of selected two-frame images in one embodiment of the present application. In the present embodiment, the principal optic axis of the image acquisition device is set to be vertical to a moving plane, then the plane on which a two-dimensional image captured by the image acquisition device is located is in parallel with the moving plane of the mobile robot. In this setting manner, the position of an entity object in the projected image captured by the image acquisition device can be used to indicate the position where the entity object is projected onto the moving plane of the mobile robot, and the angle of the position of the entity object in the projected image relative to the travelling direction of the mobile robot is used to indicate the angle of the position at which the entity object is projected onto the moving plane of the mobile robot relative to the travelling direction of the mobile robot. The selected two-frame images in FIG. 3 are respectively a first frame image and a second frame image, the corresponding position at which the mobile robot acquires the first frame image is the first position P1', and the corresponding position at which the mobile robot acquires the second frame image is the second position P2'. In the present embodiment, when the mobile robot moves from the first position P1' to the second position P2', only a distance is changed, while no pose is changed. Therefore, relative position information of the mobile robot at the first position P1' and the second position P2' can be acquired by just measuring relative displacement between the first position P1' and the second position P2'. The two-frame images have an image overlapped region, and a mobile target Q as shown in FIG. 3 exists in the overlapped field of view of the image acquisition device. In the process that the mobile robot moves from the first position to the second position, the mobile target Q moves and becomes the mobile target Q' at a new position, the position of the mobile target Q in the second frame image is changed indefinitely relative to the position of the target Q in the first frame image, that is, the position change amplitude of the mobile target Q in the two-frame images has no correlation with movement information of the mobile robot in the first position P1' and the second position P2', the position change of the mobile target Q in the two-frame images cannot be figured out based on movement information of the mobile robot at the first position P1' and the second position P2', and in the present embodiment, the movement information can be for example a movement distance when the mobile robot moves from the first position P1' to the second position P2'. In the present embodiment, the mobile robot includes a position measurement device, and movement information of the mobile robot is acquired by the position measurement device of the mobile robot. For another example, the position measurement device measures a moving speed of the mobile robot, and calculates a relative displacement from a first position to a second position based on the moving speed and moving time. In some other embodiments, the position measurement device is a GPS system or a device which performs localization based on measured wireless signals, and relative position information between the first position P1' and the second position P2' is acquired according to localization information of the position measurement device at the first position and the second position. As shown in FIG. 3, a projection of a mobile target Q in a first frame image is a mobile target projection Q1, the position of a mobile target Q' in a second frame image is a mobile target projection Q2, and when the mobile target Q is a static target, the projection of the mobile target Q in the second frame image should be a projection Q2', that is, the mobile target projection Q2' is an image projection after the mobile target projection Q1 is subjected to a definite change when the mobile robot moves from a first position P1' to a second position P2', while in the present embodiment, the position change of the mobile target Q in the two-frame images cannot be figured out according to movement information of the mobile robot at the first position P1' and the second position P2', and the mobile target Q has an attribute of indefinite change during the movement of the mobile robot.

Figure 4:
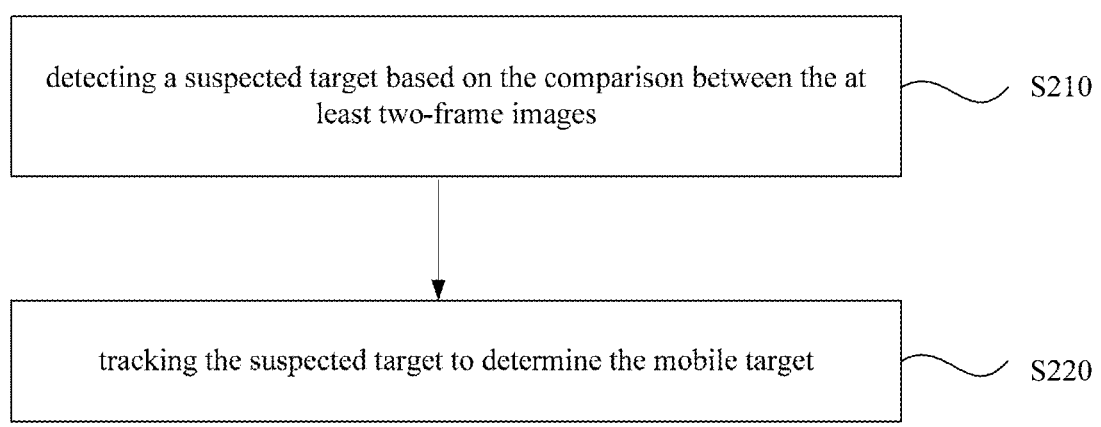
FIG. 4 shows a flow diagram of performing comparison between at least two-frame images selected from multiple-frame images in one embodiment of the present application.

Please refer to FIG. 4 which shows a flow diagram of performing comparison between at least two-frame images selected from multiple-frame images in one embodiment of the present application. The step of performing comparison between at least two-frame images selected from the multiple-frame images further includes the following step S210 and step S220.

In step S210, the processing device detects a suspected target according to a comparison between the at least two-frame images. Wherein the suspected target is a target with an attribute of indefinite change in the first frame image and the second frame image, and the suspected target moves relative to a static target within an image overlapped region of the first frame image and the second frame image. And in some embodiments, please refer to FIG. 5 which shows a flow diagram of detecting a suspected target according to comparison between at least two-frame images in one embodiment of the present application. That is, the step of detecting a suspected target according to comparison between the at least two-frame images is realized by step S211 and step S212 in FIG. 5.

In step S211, the processing device performs image compensation on the at least two-frame images based on movement information of the movement device within the time period between the at least two-frame images. In some embodiments, during the mobile robot moves from a first position to a second position, movement information is generated due to movement, herein, the movement information contains relative displacement and relative pose change of the mobile robot from the first position to the second position. Movement information can be measured by the position measurement device, and according to a proportional relationship between actual length and unit length in an image captured by the image acquisition device, a definite relative displacement of the position of a projected image of the static target within an image overlapped region of the second frame image and the first frame image is acquired, and relative pose change of the mobile robot is acquired through a pose detection device of the mobile robot, and further image compensation is performed on the first frame image or the second frame image based on movement information. For example, the image compensation is performed on the first frame image according to movement information or the image compensation is performed on the second frame image according to movement information.

In step S212, the processing device performs a subtraction processing on the compensated at least two-frame images to form a difference image, that is, the subtraction processing is performed on the compensated second frame image and the original first frame image to form a difference image, or the subtraction processing is performed on the compensated first frame image and the original second frame image to form a difference image. When a mobile target which moves relative to a static target does not exist in the image overlapped region of the first frame image and the second frame image, the result of subtraction between compensated images should be zero, and the difference image between the image overlapped regions of the first frame image and the second frame image should not contain any feature, that is, the image overlapped regions of the compensated second frame image and the original first frame image are the same, or the image overlapped regions of the compensated first frame image and the original second frame image are the same. When a mobile target which moves relative to a static target exists in an image overlapped region of the first frame image and the second frame image, the result of subtraction between compensated images is not zero, and the difference image regarding the image overlapped region of the first frame image and the second frame image contains discriminative features, that is, the image overlapped regions of the compensated second frame image and the original first frame image are not the same, and parts which cannot be coincided exist, or the image overlapped regions of the compensated first frame image and the original second frame image are not the same, and part which cannot be coincided exist. If a suspected target is judged to exist only when it is determined that discriminative feature exists in a difference image of image overlapped regions of compensated two-frame images, or the image overlapped regions of compensated two-frame images cannot be completely coincided with each other, it may lead to misjudgment. For example, when the mobile robot is at the first position, and a lamp which is turned off exists in the overlapped field of view, but when the mobile robot is at the second position and the lamp in the overlapped field of view is turned on, according to the above step, discriminative feature exists in the image overlapped region of the captured first frame image and the second frame image, and the difference result of image overlapped regions after the images are compensated is not zero, that is, the image overlapped regions after the images are compensated cannot be completely coincided. Therefore, if a suspected target is judged only by the above manner, the lamp will be misjudged to be a suspected target. Therefore, under the condition that the difference image is not zero, if obtaining a first moving track of an object within the time period during which the image acquisition device captures a first frame image and a second frame image according to the difference image, the object is judged to be the suspected target, that is, a suspected target corresponding to the first moving track exists in the overlapped field of view.

Figure 6:
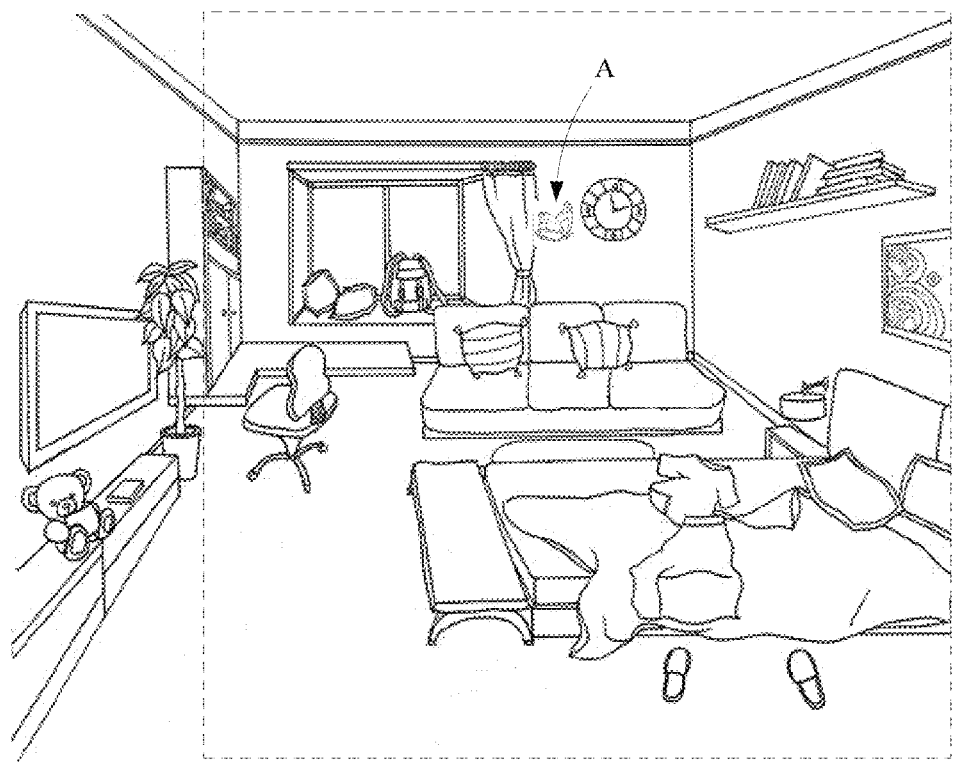
FIG. 6 shows an image diagram of a first frame image selected in one embodiment of the present application.

In some embodiments, please refer to FIG. 6 which shows an image diagram of a first frame image selected in one embodiment of the present application. Please refer to FIG.

Figure 7:
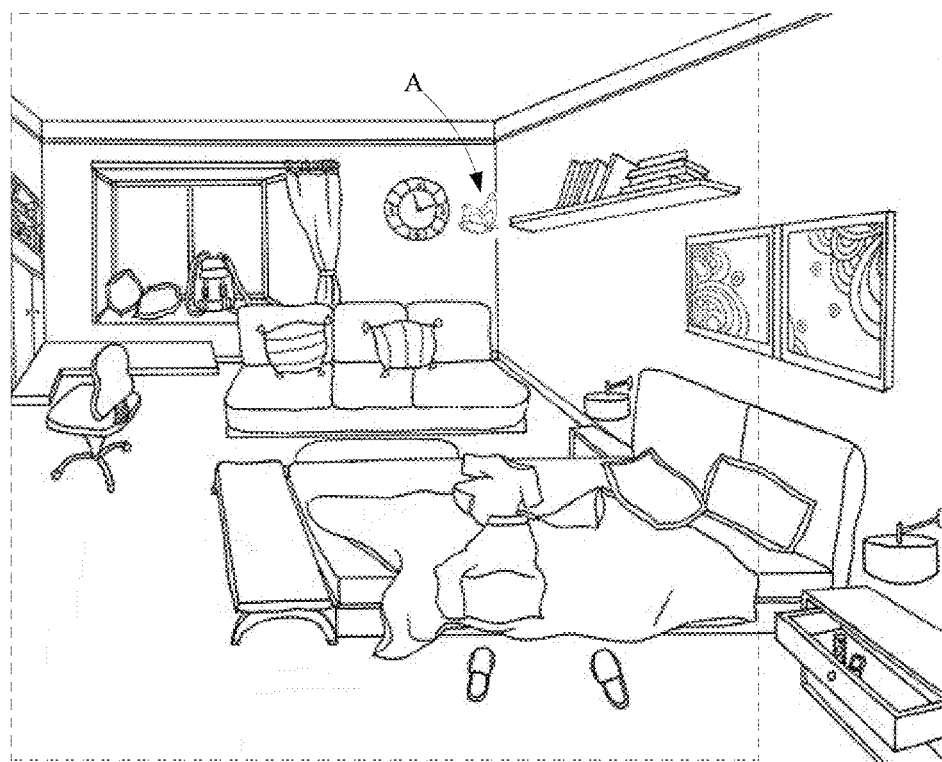
FIG. 7 shows an image diagram of a second frame image selected in one embodiment of the present application.

7 which shows an image diagram of a second frame image selected in one embodiment of the present application. Wherein FIG. 6 shows a first frame image captured by the image acquisition device of the mobile robot at a first position, and FIG. 7 shows a second frame image which is captured when the mobile robot moves from the first position to the second position, and movement information of the mobile robot from the first position to the second position is measured by the position measurement device of the mobile robot. The first frame image and the second frame image have an image overlapped region shown by a dotted box in FIG. 6 and FIG. 7, and the image overlapped region corresponds to the overlapped field of view of the image acquisition device at the first position and the second position. Moreover, the overlapped field of view of the image acquisition device contains multiple static targets, for example, chair, window, book shelf, clock, sofa, and bed. A moving butterfly A exists in FIG. 6 and FIG. 7, and the butterfly A moves relative to static targets in the overlapped field of view in FIG. 6 and FIG. 7, and the butterfly A is located in the image overlapped region of the first frame image and the second frame image. One static target in the overlapped field of view is selected now to define movement of the butterfly A, and the static target can be selected from any one of chair, window, book shelf, clock, sofa, bed and so on. Since the image of the clock in FIG. 6 and FIG. 7 is relatively complete, the shape of the clock is regular and is easily recognized, and the size of the clock can better show movement of the butterfly A, therefore, the clock in FIG. 6 and FIG. 7 is selected herein to be a static target which shows movement of the butterfly A. Obviously, it can be seen from FIG. 6 that the butterfly A is at the left side of the clock, while in FIG. 7, the butterfly A is at the right side of the clock. According to the movement information measured by the position measurement device, the second frame image is compensated, and the processing device performs subtraction processing on the compensated second frame image and the original first frame image to form a difference image. The difference image has a discriminative feature i.e. butterfly A which exists simultaneously in the first frame image and the second frame image and which cannot be eliminated through subtraction. Based on this, the butterfly A is judged to move (from the left side of the clock to the right side of the clock) relative to a static target (the static target is for example a clock) in the overlapped field of view during the mobile robot moves from the first position to the second position, and positions of the butterfly A in the first frame image and the second frame image have an attribute of indefinite change.

In another specific embodiment, when a mobile robot is at a first position, a first frame image as shown in FIG. 6 is captured by an image acquisition device at the first position, and when the mobile robot moves to a second position, a second frame image as shown in FIG. 7 is captured by the image acquisition device at the second position. The first frame image and the second frame image have an image overlapped region as shown in FIG. 6 and FIG. 7, and the image overlapped region corresponds to the overlapped field of view of the image acquisition device at the first position and the second position. Moreover, the overlapped field of view of the image acquisition device includes multiple static targets, for example, chair, window, book shelf, clock, sofa, bed, and so on. In addition, a moving butterfly A exists in the present embodiment, and the butterfly A moves relative to static targets in the overlapped field of view of FIG. 6 and FIG. 7. In the first frame image, the butterfly A for example is at the end of the bed and is within the image overlapped region, and in the second frame image, the butterfly A for example is at the head of the bed and is outside the image overlapped region. In this case, according to the movement information measured by the position measurement device, the second frame image is compensated, and the processing device performs subtraction processing on the compensated second frame image and the original first frame image to form a difference image. The difference image has a discriminative feature i.e. butterfly A which exists simultaneously in the first frame image and the second frame image and which cannot be eliminated through subtraction. Based on this, the butterfly A is judged to move (from an end to a head) relative to a static target (the static target is for example a bed) in an overlapped field of view when the mobile robot moves from the first position to the second position, and positions of the butterfly A in the first frame image and the second frame image have an attribute of indefinite change.

Figure 5:
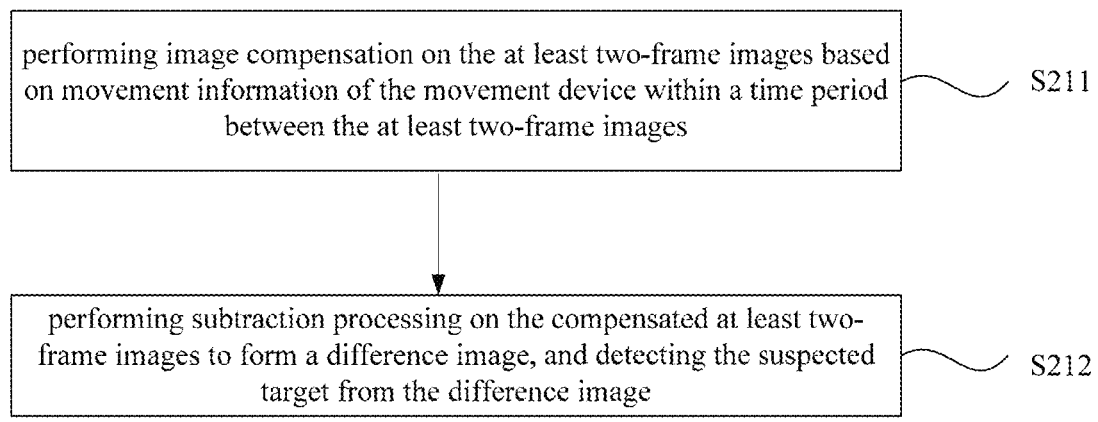
FIG. 5 shows a flow diagram of detecting a suspected target based on comparison between at least two-frame images in one embodiment of the present application.

Movement of a mobile target is generally continuous. In order to prevent misjudgment in some special situations, and to improve accuracy and effectiveness of the system, herein, step S220 is further performed, that is, the suspected target is tracked to determine that the suspected target is a mobile target. Special condition is that, for example, some hanging decorations or ceiling lamps swing regularly at a certain amplitude because of wind. Generally, the swing is merely regular back-and-forth movement within a small range or merely irregular movement at a small amplitude, and the movement cannot form continuous movement. The object which swings due to wind forms discriminative feature in the difference image, and forms a moving track. According to the method as shown in FIG. 5, the object which swings due to wind will be judged to be a suspected target, and these objects which swing at a certain amplitude due to wind will be misjudged to be a mobile target if using the method shown in FIG. 5.

Figure 8:
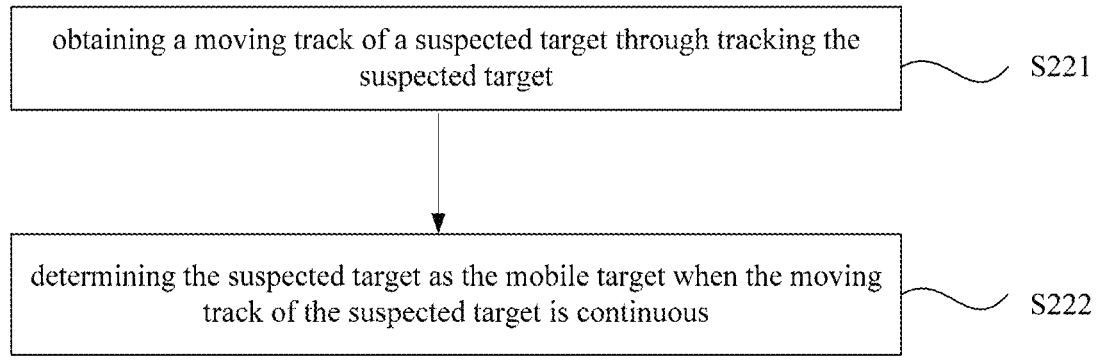
FIG. 8 shows a flow diagram of tracking a suspected target to determine that the suspected target is a mobile target in one embodiment of the present application.

Please refer to FIG. 8 which shows a flow diagram of tracking a suspected target to determine that the suspected target is a mobile target in one embodiment of the present application. In some embodiments, the method of tracking the suspected target to determine a mobile target refers to step S221 and step S222 shown in FIG. 8.

In step S221, the processing device acquires a moving track of a suspected target through tracking the suspected target; and in step S222, if the moving track of the suspected target is continuous, the suspected target is determined to be a mobile target. In some embodiments, among multiple-frame images captured by the image acquisition device, a third frame image within a field of view when the mobile robot moves from a second position to a third position is continuously captured. The first frame image, the second frame image and the third frame image are images acquired in sequence, the second frame image and the third frame image have an image overlapped region, and a comparison detection is performed on the second frame image and the third frame image according to step S211 and step S212. When the second frame image and the compensated third frame image are subjected to subtraction processing and the difference image between image overlapped regions thereof is not zero, that is, when a discriminative feature exists in the difference image, and the discriminative feature simultaneously exists in the second frame image and the third frame image, a second moving track of the suspected target within the time period when the image acquisition device captures the second frame image and the third frame image is obtained based on the difference image, and when the first moving track and the second moving track are continuous, the suspected target is determined to be a mobile target. In order to ensure accuracy in identifying a mobile target, more images in a relative continuous time period can be acquired in sequence by the image acquisition device, and each comparison detection is performed on the newly acquired image and adjacent image according to step S211 and step S212, and further more moving tracks of the suspected target are obtained, so as to judge whether the suspected target is a mobile target. thus ensure accuracy of judged results. For example, as for the butterfly A in FIG. 6 and FIG. 7, after a third frame image is acquired, the butterfly A moves to the head of the bed. In view of this, the comparison detection is performed on the second frame image and the third frame image as shown in FIG. 7 according to step S211 and step S212, the subtraction processing is performed between the second frame image and the compensated third frame image as shown in FIG. 7 and a difference image of the image overlapped regions thereof is not zero, meanwhile a discriminative feature i.e. the butterfly A exists, and a second moving track about the butterfly A within the time period when the image acquisition device captures the second frame image and the third frame image can be obtained based on the difference image, thus a moving track of the suspected target (the butterfly A) which moves from the left side of the clock to the right side of the clock and then moves to the head of bed can be obtained, that is, the butterfly A is judged to be a mobile target.

In some other embodiments, the suspected target is tracked according to an image feature of the suspected target. Wherein the image feature includes a preset graphic feature corresponding to a suspected target, or an image feature obtained through performing an image processing algorithm on a suspected target. Wherein the image processing algorithm includes but is not limited to at least one of the following: grayscale processing, sharpening processing, contour extraction, corner extraction, line extraction, and image processing algorithms obtained by machine learning. Image processing algorithm obtained by machine learning includes but is not limited to: neural network algorithm and clustering algorithm. Among multiple-frame images captured by the image acquisition device, a third frame image within the field of view when the mobile robot moves from a second position to a third position is continuously acquired. The first frame image, the second frame image and the third frame image are images acquired in sequence, and the second frame image and the third frame image have an image overlapped region, a suspected target is searched in the third frame image according to the image feature of the suspected image. And a static object exists within the overlapped field of view in which the image acquisition device captures the second frame image and the third frame image, according to relative position information of the mobile robot at the second position and the third position, and also the position change of the suspected target relative to a same static target in the second frame image and the third frame image, a second moving track of the suspected target within the time period in which the image acquisition device captures the second frame image and the third frame image is obtained. When the first moving track and the second moving track are continuous, the suspected target is determined to be a mobile target. In order to ensure accuracy in identifying a mobile target, more images can be acquired, and as for the newly acquired image and an adjacent image, the suspected target are tracked according to image features of the suspected target, and further more moving tracks of the suspected target are obtained, so as to judge whether the suspected target is a mobile target, thus ensure accuracy of judged results.

Figure 9:
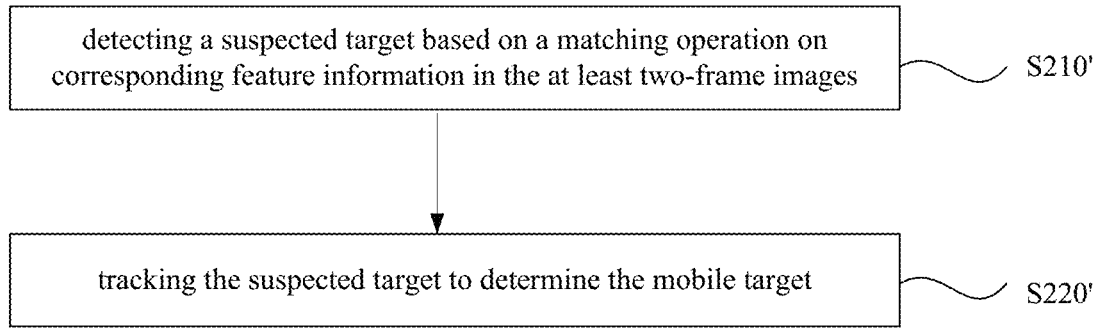
FIG. 9 shows a flow diagram of performing comparison between at least two-frame images selected from multiple-frame images in one embodiment of the present application.

In some embodiments, please refer to FIG. 9 which shows a flow diagram of comparing between at least two-frame images selected from multiple-frame images in one embodiment of the present application. The comparison between at least two-frame images selected from the multiple-frame images includes step S210' and step S220' as shown in FIG. 9.

In step S210', the processing device detects a suspected target on the basis of a matching operation on corresponding feature information in the at least two-frame images. The feature information includes at least one of the following: feature point, feature line, feature color, and so on. Please refer to FIG. 10 which shows a flow diagram of detecting a suspected target according to a matching operation on corresponding feature information in at least two-frame images in one embodiment of the present application. And step S210' is realized through step S211' and step S212'.

In step S211', the processing device extracts each feature point in the at least two-frame images respectively, and matches each feature point extracted from the at least two-frame images with a reference three-dimensional coordinate system; wherein the reference three-dimensional coordinate system is formed by performing three-dimensional modeling on a mobile space, and the reference three-dimensional coordinate system is marked with coordinates of each feature point for all the static targets in the mobile space. The feature point for example includes angular point, end point, inflection point etc., corresponding to the entity objects. In some embodiments, a set of feature points corresponding to a static target can form an external contour of the static target, that is, a corresponding static target can be recognized through a set of feature points. An image identification can be performed in advance on all the static targets in a mobile space where a mobile robot moves according to identification conditions, so as to obtain feature points related to each static target respectively, and coordinates of each feature point can be marked on the reference three-dimensional coordinate system. Coordinates of feature points of each static target can be manually uploaded according to a certain format, and the coordinates can be marked on the reference three-dimensional coordinate system.

In step S212', the processing device detects a feature point set, constituted by corresponding feature points which are not matched with the reference three-dimensional coordinate system, in the at least two-frame images to be a suspected target. When a feature point set, constituted by feature points which are not matched with corresponding feature points on the reference three-dimensional coordinate system, is found in a single image, it can only indicate that the feature point set does not belong to any static target which has been marked on the reference three-dimensional coordinate system, however, the feature point set may indicate a static object which is newly added in the mobile space and whose coordinates of feature points are not marked in advance on the reference three-dimensional coordinate system. Based on this, it is necessary to determine whether the feature point set, constituted by feature points which are not matched with corresponding feature points on the reference three-dimensional coordinate system, moves or not according to the matching result between two-frame images. In some embodiments, the feature point sets, which are not matched with the feature points in the reference coordinates, of the first frame image and the second frame image are the same as or similar to each other. When the feature point set moves relative to the static target within the time period during which the image acquisition device captures the first frame image and the second frame image, a first moving track of the feature point set is formed, thus the feature point set is detected to be a suspected target.

For example, in FIG. 6 and FIG. 7, feature points of a static target such as chair, window, book shelf, clock, sofa, bed and so on can all be extracted in advance and marked in the reference three-dimensional coordinate system, while butterfly A in FIG. 6 and FIG. 7 is a newly added object, and is not marked in the reference three-dimensional coordinate system, in this case, by matching each feature point extracted from the first frame image and the second frame image with the reference three-dimensional coordinate system, feature point which is not marked on the reference three-dimensional coordinate system is obtained, and the set of feature points shows as features of the butterfly A, for example, the set of feature points can be displayed as contour features of the butterfly A. Moreover, in the first frame image as shown in FIG. 6, the butterfly A is located at a left side of the clock, while in the second frame image as shown in FIG. 7, the butterfly A is located at a right side of the clock, that is, a first moving track showing the butterfly A moves from a left side of the clock to a right side of the clock can be obtained through matching the first frame image and the second frame image with the feature points marked on the reference three-dimensional coordinate system respectively.

Figure 10:
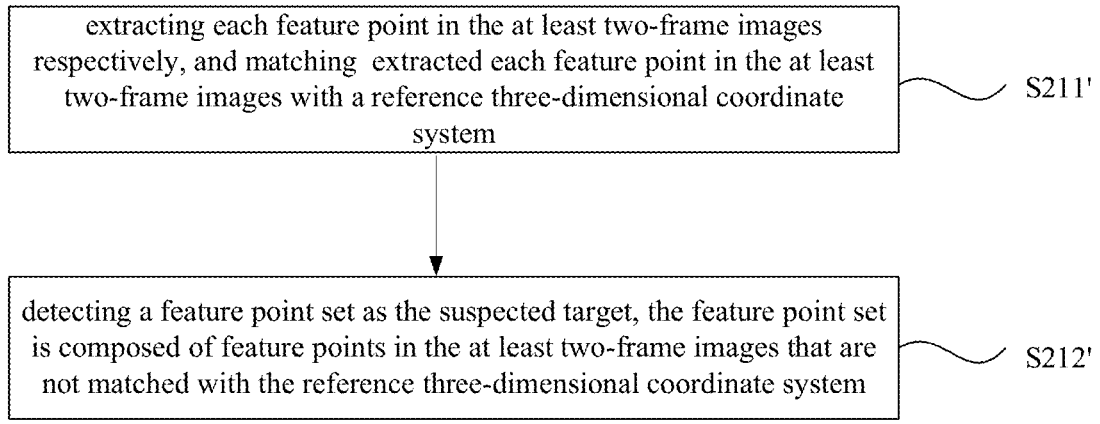
FIG. 10 shows a flow diagram of detecting a suspected target based on a matching operation on corresponding feature information in at least two-frame images in one embodiment of the present application.
Figure 11:
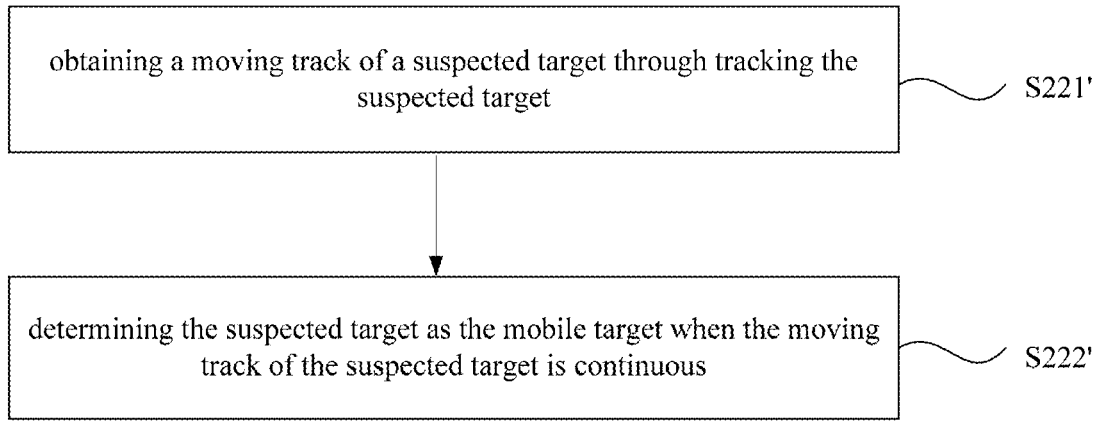
FIG. 11 shows a flow diagram of tracking a suspected target to determine a mobile target in one embodiment of the present application.

Movement of a mobile target is generally continuous. In order to prevent misjudgment in some special situations, and to improve accuracy and effectiveness of the system, herein, step S220' is further performed, that is, the suspected target is tracked to determine that the suspected target is a mobile target. Special condition is that, for example, some hanging decorations or ceiling lamps swing regularly at a certain amplitude because of wind. Generally, the swing is merely regular back-and-forth movement within a small range or merely irregular movement at a small amplitude, and the movement cannot form continuous movement. The object which swings due to wind forms discriminative feature in the difference image, and forms a moving track. According to the method as shown in FIG. 10, the object which swings due to wind will be judged to be a suspected target, and these objects which swing at a certain amplitude due to wind will be misjudged to be a mobile target if using the method shown in FIG. 10. In some embodiments, please refer to FIG. 11 which shows a flow diagram of tracking a suspected target to determine a mobile target in one embodiment of the present application. For the method of tracking the suspected target to determine a mobile target, please refer to step S221' and step S222' as shown in FIG. 11.

In step S221', the processing device acquires a moving track of a suspected target through tracking the suspected target; and in step S222', if the moving track of the suspected target is continuous, the suspected target is determined to be a mobile target. In some embodiments, among multiple-frame images captured by the image acquisition device, a third frame image at a third position of the mobile robot is further captured. The first frame image, the second frame image and the third frame image are images acquired in sequence, the second frame image and the third frame image have an image overlapped region, and a comparison detection is performed on the second frame image and the third frame image according to step S211 and step S212. When the second frame image and the compensated third frame image are subjected to subtraction processing and the difference image thereof is not zero, that is, when a discriminative feature exists in the difference image, and the discriminative feature simultaneously exists in the second frame image and the third frame image, a second moving track of the suspected target within the time period when the image acquisition device captures the second frame image and the third frame image is obtained based on the difference image, and when the first moving track and the second moving track are continuous, the suspected target is determined to be a mobile target. In order to ensure accuracy in identifying a mobile target, more images can be acquired in sequence by the image acquisition device, and each comparison detection is performed on the newly acquired image and adjacent image according to step S211 and step S212, and further more moving tracks of the suspected target are obtained, so as to judge whether the suspected target is a mobile target. thus ensure accuracy of judged results. For example, as for the butterfly A in FIG. 4 and FIG. 5, after a third frame image is acquired, the butterfly A moves to the head of the bed. In view of this, the comparison detection is performed on the second frame image and the third frame image as shown in FIG. 5 according to step S211 and step S212, the subtraction processing is performed between the second frame image and the compensated third frame image as shown in FIG. 5 and a difference image of the image overlapped regions thereof is not zero, meanwhile a discriminative feature i.e. the butterfly A exists, and a second moving track about the butterfly A within the time period when the image acquisition device captures the second frame image and the third frame image can be obtained based on the difference image, thus a moving track of the suspected target (the butterfly A) which moves from the left side of the clock to the right side of the clock and then moves to the head of bed can be obtained, that is, the butterfly A is judged to be a mobile target.

In some other embodiments, the suspected target is tracked according to an image feature of the suspected target. Wherein the image feature includes a preset graphic feature corresponding to a suspected target, or an image feature obtained through performing an image processing algorithm on a suspected target. Wherein the image processing algorithm includes but is not limited to at least one of the following: grayscale processing, sharpening processing, contour extraction, corner extraction, line extraction, and image processing algorithms obtained by machine learning. Image processing algorithm obtained by machine learning includes but is not limited to: neural network algorithm and clustering algorithm. Among multiple-frame images captured by the image acquisition device, a third frame image at a third position of the mobile robot is further acquired. The first frame image, the second frame image and the third frame image are images acquired in sequence, and the second frame image and the third frame image have an image overlapped region, a suspected target is searched in the third frame image according to the image feature of the suspected image. And a static object exists within the overlapped field of view in which the image acquisition device captures the second frame image and the third frame image, according to relative position information of the mobile robot at the second position and the third position, and also the position change of the suspected target relative to a same static target in the second frame image and the third frame image, a second moving track of the suspected target within the time period in which the image acquisition device captures the second frame image and the third frame image is obtained. When the first moving track and the second moving track are continuous, the suspected target is determined to be a mobile target. In order to ensure accuracy in identifying a mobile target, more images can be acquired, and as for the newly acquired image and an adjacent image, the suspected target are tracked according to image features of the suspected target, and further more moving tracks of the suspected target are obtained, so as to judge whether the suspected target is a mobile target, thus ensure accuracy of judged results.

Figure 12:
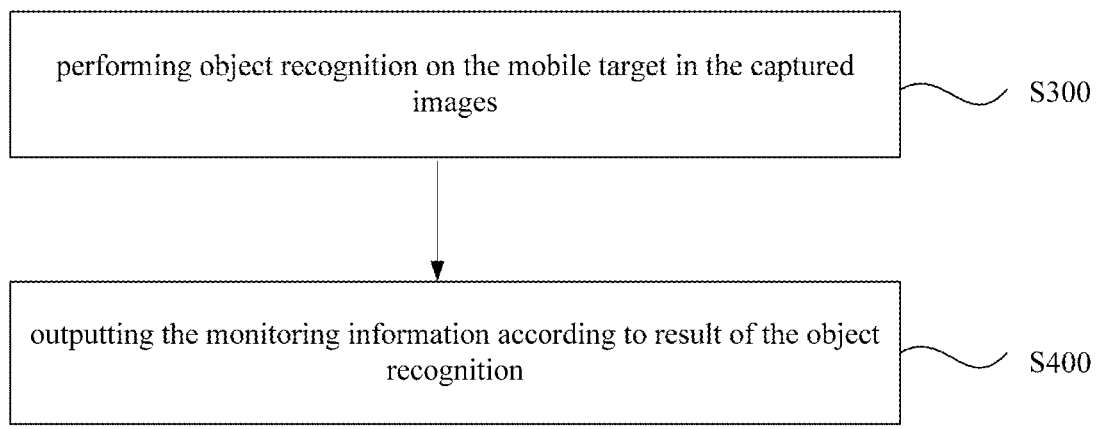
FIG. 12 shows a flow diagram of object recognition in one embodiment of the present application.

In some embodiments, please refer to FIG. 12 which shows a flow diagram of object recognition in one embodiment of the present application. The monitoring method further includes step S300 and step S400. In step S300, the processing device performs object recognition on a mobile target in a captured image; wherein, the object recognition means recognition of a target object through a method of feature matching or model recognition. A method of object recognition based on feature matching generally includes the following steps: extracting an image feature of an object, describing the extracted feature, and performing feature matching on the described object. The image feature includes graphic feature corresponding to the mobile target, or image feature obtained through an image processing algorithm. Wherein the image processing algorithm includes but is not limited to at least one of the following: grayscale processing, sharpening processing, contour extraction, corner extraction, line extraction, and image processing algorithms obtained through machine learning. The mobile target includes for example a mobile person or a mobile animal. Herein, the object recognition is realized by an object recognizer which includes a trained neural network. In some embodiments, the neural network model is a convolutional neural network, and the network structure includes an input layer, at least one hidden layer and at least one output layer. Wherein the input layer is configured to receive captured images or preprocessed images; the hidden layer includes a convolutional layer and an activation function layer, and even includes at least one of a normalization layer, a pooling layer and a fusion layer; and the output layer is configured to output images marked with object type labels. The connection mode is determined according to a connection relationship of each layer in a neural network model, for example, a connection relationship between a front layer and a rear layer set based on data transmission, a connection relationship with data of the front layer set based on size of a convolution kernel in each hidden layer, and a full connection relationship. Features and advantages of an artificial neural network mainly include the following three aspects: firstly, function of self learning, secondly, function of associative storage, and thirdly, capability of searching for an optimal solution at a high speed.

In step S400, the processing device outputs monitoring information according to results of object recognition. The monitoring information includes one or more of image information, video information, audio information, and text information. The monitoring information can be image picture containing the mobile target, and can also be prompt information which is sent to a preset communication address, and the prompt information can be for example prompt message of an APP, short message, mail, voice broadcast, alarm, and so on. The prompt information contains key words related to the mobile target. When a key word of the mobile target is "person", the prompt information can be prompt message of an APP, short message, mail, voice broadcast and alarm containing the key word "person", for example, an information of "somebody is intruding" in the form of text or voice. The preset communication address at least contains one of the followings: a telephone number bound with the mobile robot, instant messaging accounts (Wechat accounts, QQ accounts or Facebook accounts, etc.), an e-mail address and a network platform.

Figure 13:
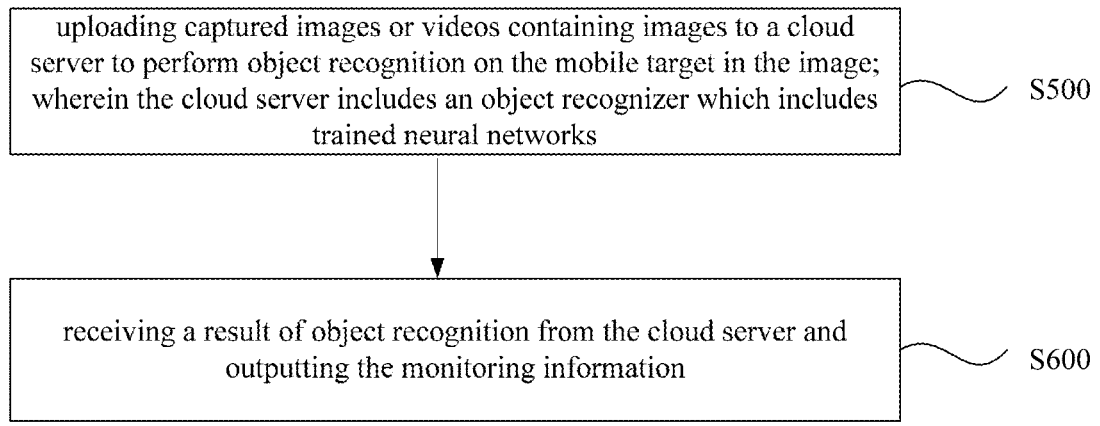
FIG. 13 shows a flow diagram of object recognition in another embodiment of the present application.

Training of the object recognizer and object recognition based on the object recognizer both involve a complex calculating process, which means huge calculating quantity and a high requirement on hardware of device which contains and runs the object recognizer, therefore, in some embodiments, please refer to FIG. 13 which shows a flow diagram of object recognition in one embodiment of the present application. The method further includes step S500 and step S600;

In step S500, the processing device uploads the captured image or video containing an image to a cloud server for object recognition on a mobile target in the image; and the cloud server includes an object recognizer containing a trained neural network;

In step S600, the processing device receives results of object recognition from the cloud server and outputs monitoring information. The monitoring information includes one or more of image information, video information, audio information, and text information. The monitoring information can be image picture containing the mobile target, and can also be prompt information which is sent to a preset communication address, and the prompt information can be for example prompt message of an APP, short message, mail, voice broadcast, alarm, and so on. The prompt information contains key words related to the mobile target. When a key word of the mobile target is "person", the prompt information can be prompt message of an APP, short message, mail, voice broadcast and alarm containing the key word "person", for example, an information of "somebody is intruding" in the form of text or voice.

Due to the detection and recognition operations of a mobile target are performed on the cloud server, operating pressure of a local mobile robot can be lowered, requirements on hardware of the mobile robot can be reduced, and execution efficiency of the mobile robot can be improved; moreover, strong processing functions of a cloud server can be sufficiently used, thereby enabling the implementation of the methods to be more rapid and accurate.

In some other embodiments, the mobile robot captures images through an image acquisition device and selects a first frame image and a second frame image among the captured images, then the mobile robot uploads the first frame image and the second frame image to the cloud server for image comparison, and receives results of object recognition sent by the cloud server. Or for example, the mobile robot directly uploads the captured images to the cloud server after the mobile robot captures images through an image acquisition device, the cloud server selects two-frame images according to the monitoring method for a mobile target and performs image comparison on the selected two-frame images, and then the mobile robot receives results of object recognition sent by the cloud server. For the monitoring method of the mobile target, please refer to FIG. 1 and related description of FIG. 1, and the monitoring method will not be described in detail herein. When more data processing programs are executed at cloud, requirements on hardware of the mobile robot itself will be further lowered. When programs need to be revised and updated, the programs in the cloud can be directly revised and updated conveniently, thereby improving efficiency and flexibility of system updating.

As mentioned above, the monitoring method used in a mobile robot for a mobile target has the following beneficial effects: through the technical solution that acquiring multiple-frame images captured by an image acquisition device under an moving state of a robot in a monitored region, selecting at least two-frame images with an overlapped region from the multiple-frame images, performing comparison between the selected images by image compensation method or feature matching method, and outputting monitoring information containing a mobile target which moves relative to a static target based on the result of comparison, and wherein the position of the mobile target in each of the at least two-frame images has an attribute of indefinite change, the mobile target in the monitored region can be recognized precisely during movement of the mobile robot, and monitoring information about the mobile target can be generated to prompt correspondingly, thereby safety of the monitored region can be effectively ensured.

Figure 14:
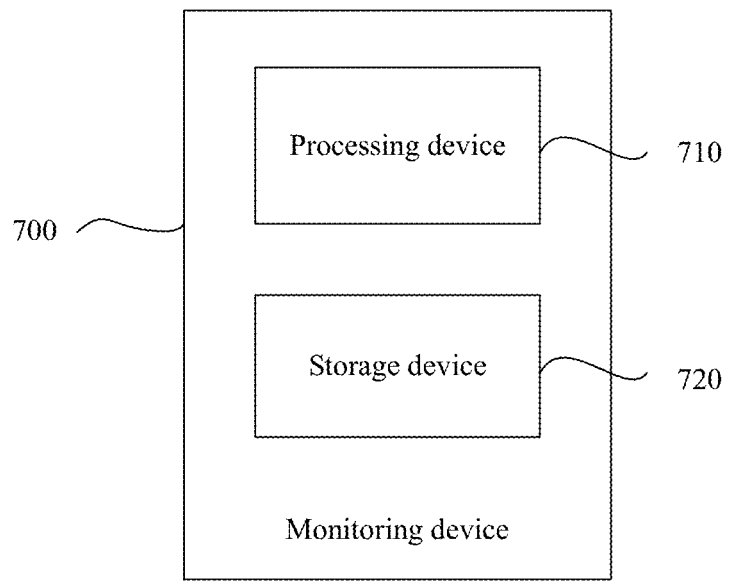
FIG. 14 shows a structural schematic diagram of a monitoring device for a mobile target used in a mobile robot of the present application in one embodiment.

Please refer to FIG. 14 which shows a structural schematic diagram of a monitoring device of a mobile target used in a mobile robot of the present application in one embodiment. The mobile robot includes a movement device and an image acquisition device. The image acquisition device is arranged on the mobile robot, and is configured to capture an entity object within a field of view of the image acquisition device at the position where a mobile robot is located, so as to obtain a projected image, wherein the projected image is located on the plane which is parallel to the moving plane. The image acquisition device includes but is not limited to: fisheye camera module, wide angle (or non-wide angle) camera module, depth camera module, camera module integrated with an optical system or CCD chip, and camera module integrated with an optical system and CMOS chip. The mobile robot includes, but is not limited to, a family companion mobile robot, a cleaning robot, a patrol mobile robot, a glass cleaning robot, etc. The power supply system of the image acquisition device can be controlled by the power supply system of the mobile robot, and during the period that the mobile robot is powered on and moves, the image acquisition device begins to capture images. The mobile robot at least includes an image acquisition device. The image acquisition device captures images within a field of view at a position where the mobile robot is located. For example, a mobile robot includes an image acquisition device which is arranged on the top, shoulder or back of the mobile robot, and the principal optic axis of the image acquisition device is vertical to a moving plane of the mobile robot, or the principal optic axis is consistent with a travelling direction of the mobile robot. In some other embodiments, the principal optic axis can also be set to form a certain angle (for example, an angle between 50° and 86°) with the moving plane on which the mobile robot is located, to acquire a greater image acquisition range. In other embodiments, the principal optic axis of the image acquisition device can also be set in many other ways, for example, the image acquisition device can rotate according to a certain rule or rotate randomly, in this case, an angle between the optic axis of the image acquisition device and a travelling direction of the mobile robot is constantly changed, therefore, installation manners of the image acquisition device and states of the principal optic axis of the image acquisition device are not limited to what are enumerated in the present embodiment. For another example, the mobile robot includes two or more image acquisition devices, for example, a binocular image acquisition device or a multi-image acquisition devices. For two or more image acquisition devices, the principal optic axis of one image acquisition device is vertical to moving plane of the mobile robot, or the principal optic axis is consistent with a travelling direction of the mobile robot. In some other embodiments, the principal optic axis can also be set to form a certain angle with the moving plane, so as to acquire a greater image acquisition range. In other embodiments, the principal optic axis of the image acquisition device can also be set in many other ways, for example, the image acquisition device can rotate according to a certain rule or rotate randomly, in this case, an angle between the optic axis of the image acquisition device and a travelling direction of the mobile robot is constantly changed, therefore, installation manners of the image acquisition device and states of the principal optic axis of the image acquisition device are not limited to what are enumerated in the present embodiment.

In an embodiment where the mobile robot is a cleaning robot, a movement device of the mobile robot can include a travelling mechanism and a travelling drive mechanism, wherein the travelling mechanism can be arranged at a bottom of the robot body, and the travelling drive mechanism is arranged inside the robot body. The travelling mechanism can for example include a combination of two straight-going walking wheels and at least one auxiliary steering wheel, wherein the two straight-going walking wheels are respectively arranged at two opposite sides at a bottom of the robot body, and the two straight-going walking wheels can be independently driven by two corresponding travelling drive mechanisms respectively, that is, a left straight-going walking wheel is driven by a left travelling drive mechanism, while a right straight-going walking wheel is driven by a right travelling drive mechanism. The universal walking wheel or the straight-going walking wheel can be provided with a bias drop suspension system which is fixed in a movable manner, for example, the bias drop suspension system can be installed on a robot body in a rotatable manner and receives spring bias which is downwards and away from the robot body. The spring bias enables the universal walking wheel or the straight-going walking wheel to maintain contact and traction with the ground with a certain landing force. In practical applications, under the condition that the at least one auxiliary steering wheel does not work, the two straight-going walking wheels are mainly used for going forward and backward, while when the at least one auxiliary steering wheel participates and matches with the two straight-going walking wheels, movements such as steering and rotating can be realized. The travelling drive mechanism can include a drive motor and a control circuit configured to control the drive motor, and the drive motor can be used to drive the walking wheels in the travelling mechanism to move. In specific implementations, the drive motor can be for example a reversible drive motor, and a gear shift mechanism can be further arranged between the drive motor and the axle of a walking wheel. The travelling drive mechanism can be installed on the robot body in a detachable manner, thereby facilitating disassembly and maintenance.

In this embodiment, the monitoring device 700 for a mobile target includes: at least one processing device 710 and at least one storage device 720. Wherein the processing device is an electronic device which is capable of performing numeric calculation, logical calculation and data analysis, and the processing device includes but is not limited to: CPU, GPU, FPGA, etc. The storage device 720 may include high-speed RAM (random access memory) and may also include NVM (non-volatile memory), such as one or more disk storage devices, flash memory devices or other non-volatile solid-state storage devices. In some embodiments, the storage device may also include a storage device away from one or more processors, such as network attached storage device accessed via RF circuits or external ports and communication networks, wherein the communication network can be the Internet, one or more intranets, LAN, WLAN, SAN, etc., or an appropriate combination thereof. The memory controller can control access to memory by other components of the device, such as CPU and peripheral interfaces.

Wherein, the storage device 720 is used to store images captured by the image acquisition device under an operating state of the movement device. At least one program is stored in the at least one storage device 720, and is invoked by the at least one processing device 710 such that the monitoring device 700 performs a monitoring method for a mobile target. The monitoring method for a mobile target can be seen in FIG. 1 and its description, thus it's not repeated here.

Figure 15:
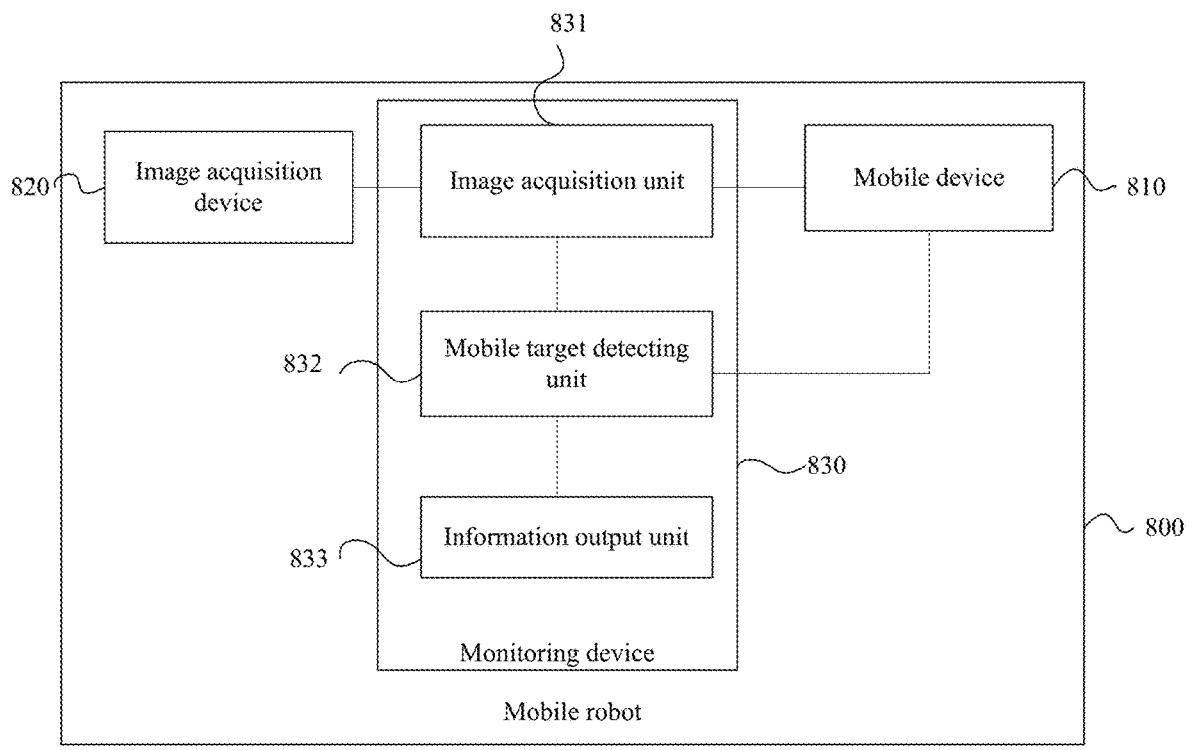
FIG. 15 shows a structural schematic diagram of a mobile robot of the present application in one embodiment.

Please refer to FIG. 15, which shows a structural schematic diagram of a mobile robot of the present application in one embodiment. The mobile robot 800 include the movement device 810, the image acquisition device 820 and the monitoring device 830. The image acquisition device 820 is arranged on the mobile robot 800, and is configured to capture an entity object within a field of view of the image acquisition device 820 at the position where the mobile robot 800 is located, so as to obtain a projected image, wherein the projected image is located on the plane which is parallel to the moving plane. The image acquisition device 820 includes but is not limited to: fisheye camera module, wide angle (or non-wide angle) camera module, depth camera module, camera module integrated with an optical system or CCD chip, and camera module integrated with an optical system and CMOS chip. The mobile robot 800 includes, but is not limited to, a family companion mobile robot, a cleaning robot, a patrol mobile robot, a glass cleaning robot, etc. The power supply system of the image acquisition device 820 can be controlled by the power supply system of the mobile robot 800, and during the period that the mobile robot is powered on and moves, the image acquisition device 820 begins to capture images. The mobile robot 800 at least includes an image acquisition device 820. The image acquisition device 820 captures images within a field of view at a position where the mobile robot 800 is located. For example, a mobile robot 800 includes an image acquisition device 820 which is arranged on the top, shoulder or back of the mobile robot, and the principal optic axis of the image acquisition device 820 is vertical to a moving plane of the mobile robot, or the principal optic axis is consistent with a travelling direction of the mobile robot. In some other embodiments, the principal optic axis can also be set to form a certain angle (for example, an angle between 50° and 86°) with the moving plane on which the mobile robot is located, to acquire a greater image acquisition range. In other embodiments, the principal optic axis of the image acquisition device 820 can also be set in many other ways, for example, the image acquisition device 820 can rotate according to a certain rule or rotate randomly, in this case, an angle between the optic axis of the image acquisition device 820 and a travelling direction of the mobile robot is constantly changed, therefore, installation manners of the image acquisition device 820 and states of the principal optic axis of the image acquisition device 820 are not limited to what are enumerated in the present embodiment. For another example, the mobile robot includes two or more image acquisition devices (820), for example, a binocular image acquisition device 820 or a multi-image acquisition devices (820). For two or more image acquisition devices (820), the principal optic axis of one image acquisition device 820 is vertical to moving plane of the mobile robot, or the principal optic axis is consistent with a travelling direction of the mobile robot. In some other embodiments, the principal optic axis can also be set to form a certain angle with the moving plane, so as to acquire a greater image acquisition range. In other embodiments, the principal optic axis of the image acquisition device 820 can also be set in many other ways, for example, the image acquisition device 820 can rotate according to a certain rule or rotate randomly, in this case, an angle between the optic axis of the image acquisition device 820 and a travelling direction of the mobile robot is constantly changed, therefore, installation manners of the image acquisition device 820 and states of the principal optic axis of the image acquisition device 820 are not limited to what are enumerated in the present embodiment.

In an embodiment where the mobile robot 800 is a cleaning robot, the movement device 810 of the mobile robot 800 can include a travelling mechanism and a travelling drive mechanism, wherein the travelling mechanism can be arranged at a bottom of the robot body, and the travelling drive mechanism is arranged inside the robot body. The travelling mechanism can for example include a combination of two straight-going walking wheels and at least one auxiliary steering wheel, wherein the two straight-going walking wheels are respectively arranged at two opposite sides at a bottom of the robot body, and the two straight-going walking wheels can be independently driven by two corresponding travelling drive mechanisms respectively, that is, a left straight-going walking wheel is driven by a left travelling drive mechanism, while a right straight-going walking wheel is driven by a right travelling drive mechanism. The universal walking wheel or the straight-going walking wheel can be provided with a bias drop suspension system which is fixed in a movable manner, for example, the bias drop suspension system can be installed on a robot body in a rotatable manner and receives spring bias which is downwards and away from the robot body. The spring bias enables the universal walking wheel or the straight-going walking wheel to maintain contact and traction with the ground with a certain landing force. In practical applications, under the condition that the at least one auxiliary steering wheel does not work, the two straight-going walking wheels are mainly used for going forward and backward, while when the at least one auxiliary steering wheel participates and matches with the two straight-going walking wheels, movements such as steering and rotating can be realized. The travelling drive mechanism can include a drive motor and a control circuit configured to control the drive motor, and the drive motor can be used to drive the walking wheels in the travelling mechanism to move. In specific implementations, the drive motor can be for example a reversible drive motor, and a gear shift mechanism can be further arranged between the drive motor and the axle of a walking wheel. The travelling drive mechanism can be installed on the robot body in a detachable manner, thereby facilitating disassembly and maintenance.

The monitoring device 830 is in communication links with the movement device 810 and the image acquisition device 820, the monitoring device 830 includes image acquisition unit 831, mobile target detecting unit 832 and information output unit 833.

The image acquisition unit 831 is in communication links with both the movement device 810 and the image acquisition device 820, and the image acquisition unit 831 acquires multiple-frame images captured by the image acquisition device 820 under the operating state of the movement device 810. In some embodiments, the multiple-frame images can be for example multiple-frame images acquired in a continuous time period, or multiple-frame images acquired within two or more discontinuous time periods.

The mobile target detecting unit 832 performs comparison between at least two-frame images selected from the multiple-frame images so as to detect a mobile target. The at least two-frame images are images captured by the mage acquisition device 820 within partially overlapped field of view. That is, the mobile target detecting unit 832 determines to select a first frame image and a second frame image on the basis that the two-frame images contain an image overlapped region, and the overlapped field of view contains a static target, so as to monitor a mobile target which moves relative to the static target in the overlapped field of view. In order to ensure effectiveness of compared results between the selected two-frame images, the proportion of the image overlapped region in the first frame image and in the second frame image can also be set, for example, the proportion of the image overlapped region in the first frame image and in the second frame image are respectively at least 50% (but the proportions are not limited to this proportion, different proportions of the first frame image and the second frame image can be set depending on the situation). The selection of the first frame image and the second frame image should be continuous to some extent, and while ensuring that the first frame image and the second frame image have a certain proportion of an image overlapped region, the continuity of the moving track of the mobile target can be judged based on acquired images. A position of the mobile target in each of the at least two-frame images has an attribute of indefinite change.

The information output unit 833 output monitoring information containing a mobile target which moves relative to a static target according to a result of performing comparison between at least two-frame images. In some embodiments, the static target for example includes but is not limited to: ball, shoe, wall, flowerpot, cloth and hat, roof, lamp, tree, table, chair, refrigerator, television, sofa, sock, tiled object, and cup. Wherein, the tiled object includes but is not limited to ground mat or floor tile map paved on the floor, and tapestry and picture hung on a wall. In some embodiments, the monitoring information includes one or more of image information, video information, audio information, and text information. The monitoring information can be image picture containing the mobile target, and can also be prompt information which is sent to a preset communication address, and the prompt information can be for example prompt message of an APP, short message, mail, voice broadcast, alarm, and so on. The prompt information contains key words related to the mobile target. When a key word of the mobile target is "person", the prompt information can be prompt message of an APP, short message, mail, voice broadcast and alarm containing the key word "person", for example, an information of "somebody is intruding" in the form of text or voice. The preset communication address at least contains one of the followings: a telephone number bound with the mobile robot, instant messaging accounts (Wechat accounts, QQ accounts or Facebook accounts, etc.), an e-mail address and a network platform.

In some embodiments, the mobile target detecting unit 832 includes a comparing module and a tracking module.

The comparing module detects a suspected target based on the comparison between at least two-frame images; In some embodiments, the step of the comparing module detecting a suspected target based on the comparison between at least two-frame images includes:

performing image compensation on the at least two-frame images based on movement information of the movement device 810 within a time period between the at least two-frame images; That is, in this embodiment, as shown in FIG. 8, the mobile target detecting unit 832 is in communication links with the movement device 810, so as to acquire movement information of the movement device 810 within the time period between the at least two-frame images and perform image compensation on the at least two-frame images.

performing subtraction processing on the compensated at least two-frame images to form a difference image, and detecting the suspected target from the difference image.

The tracking module tracks the suspected target to determine the mobile target. In some embodiments, the step of tracking the suspected target to determine the mobile target includes:

obtaining a moving track of a suspected target through tracking the suspected target detected by the comparing module; and determining the suspected target as the mobile target when the moving track of the suspected target is continuous.

In yet some embodiments, the mobile target detecting unit 832 can identify the mobile target without communication links with the movement device 810 as shown in FIG. 8. In this embodiment, the mobile target detecting unit 832 includes a matching module and a tracking module.

The matching module detecting a suspected target based on a matching operation on corresponding feature information in the at least two-frame images. In some embodiments, the step of the matching module detecting a suspected target based on a matching operation on corresponding feature information in the at least two-frame images include:

extracting each feature point in the at least two-frame images respectively, and matching extracted each feature point in the at least two-frame images with a reference three-dimensional coordinate system; wherein the reference three-dimensional coordinate system is formed through performing three-dimensional modeling on a mobile space, and the reference three-dimensional coordinate system is marked with coordinate of each feature point on all static targets in the mobile space; and detecting a feature point set as the suspected target, the feature point set is composed of feature points in the at least two-frame images that are not matched with the reference three-dimensional coordinate system.

The tracking module tracks the suspected target to determine the mobile target. In some embodiments, the step of tracking the suspected target to determine the mobile target includes:

obtaining a moving track of a suspected target through tracking the suspected target detected by the matching module; and determining the suspected target as the mobile target when the moving track of the suspected target is continuous.

In some embodiments, the monitoring device 830 further includes object recognition unit, the object recognition unit performs object recognition in the captured images, so that the information output unit can output the monitoring information based on the result of object recognition. The object recognition unit includes a trained neural network. Wherein, the object recognition means recognition of a target object through a method of feature matching or model recognition. A method of object recognition based on feature matching generally includes the following steps: extracting an image feature of an object, describing the extracted feature, and performing feature matching on the described object. The image feature includes graphic feature corresponding to the mobile target, or image feature obtained through an image processing algorithm. Wherein the image processing algorithm includes but is not limited to at least one of the following: grayscale processing, sharpening processing, contour extraction, corner extraction, line extraction, and image processing algorithms obtained through machine learning. The mobile target includes for example a mobile person or a mobile animal. Herein, the object recognition is realized by an object recognizer which includes a trained neural network. In some embodiments, the neural network model is a convolutional neural network, and the network structure includes an input layer, at least one hidden layer and at least one output layer. Wherein the input layer is configured to receive captured images or preprocessed images; the hidden layer includes a convolutional layer and an activation function layer, and even includes at least one of a normalization layer, a pooling layer and a fusion layer; and the output layer is configured to output images marked with object type labels. The connection mode is determined according to a connection relationship of each layer in a neural network model, for example, a connection relationship between a front layer and a rear layer set based on data transmission, a connection relationship with data of the front layer set based on size of a convolution kernel in each hidden layer, and a full connection relationship. Features and advantages of an artificial neural network mainly include the following three aspects: firstly, function of self-learning, secondly, function of associative storage, and thirdly, capability of searching for an optimal solution at a high speed.

The monitoring information includes one or more of image information, video information, audio information, and text information. The monitoring information can be image picture containing the mobile target, and can also be prompt information which is sent to a preset communication address, and the prompt information can be for example prompt message of an APP, short message, mail, voice broadcast, alarm, and so on. The prompt information contains key words related to the mobile target. When a key word of the mobile target is "person", the prompt information can be prompt message of an APP, short message, mail, voice broadcast and alarm containing the key word "person", for example, an information of "somebody is intruding" in the form of text or voice. The preset communication address at least contains one of the followings: a telephone number bound with the mobile robot, instant messaging accounts (Wechat accounts, QQ accounts or Facebook accounts, etc.), an e-mail address and a network platform.

Training of the object recognition unit and object recognition based on the object recognition unit both involve a complex calculating process, which means huge calculating quantity and a high requirement on hardware of device which contains and runs the object recognizer, therefore, in some embodiments, the monitoring device 830 includes a receive-send unit, the receive-send unit uploads the captured image or video containing an image to a cloud server for object recognition on a mobile target in the image and receiving the result of object recognition from the cloud server so that the information output unit can output the monitoring information The cloud server includes an object recognizer containing a trained neural network;

Due to the detection and recognition operations of a mobile target are performed on the cloud server, operating pressure of a local mobile robot can be lowed, requirements on hardware of the mobile robot can be reduced, and execution efficiency of the mobile robot can be improved; moreover, strong processing functions of a cloud server can be sufficiently used, thereby enabling the implementation of the methods to be more rapid and accurate.

In some other embodiments, the mobile robot captures images through an image acquisition device and selects a first frame image and a second frame image among the captured images, then the mobile robot uploads the first frame image and the second frame image to the cloud server for image comparison, and receives results of object recognition sent by the cloud server. Or for example, the mobile robot directly uploads the captured images to the cloud server after the mobile robot captures images through an image acquisition device, the cloud server selects two-frame images by operating the mobile target detecting unit 832 and performs image comparison on the selected two-frame images, and then the mobile robot receives results of object recognition sent by the cloud server. When more data processing programs are executed at cloud, requirements on hardware of the mobile robot itself will be further lowered. When programs need to be revised and updated, the programs in the cloud can be directly revised and updated conveniently, thereby improving efficiency and flexibility of system updating.

The technical solution of a monitoring device 830 of a mobile target in an embodiment in FIG. 15 corresponds to the monitoring method of a mobile target. As to the monitoring method of the mobile target, please refer to FIG. 1 and related description of FIG. 1, and all the descriptions about the monitoring method of the mobile target can be applied to related embodiments of the monitoring device 830 of a mobile target and will not be repeated described in detail herein.

It should be noted that, in a device shown in FIG. 15, the modules are divided only based on the logical function. While in practical application, the modules can be all or partially integrated into a physical entity or not. The modules can be invoked by software or hardware or both. For example, each module can be an independent processing unit, or the modules can be invoked by one chip integrated in the device. For another example, a program code can be stored in the memory of the device, which is invoked by a processing unit of the device and enables the modules to function. The processing unit can be a integrated circuit with the ability to process signals. In practical application, the above steps and modules can be accomplished by integrated logical circuit in hardware or by software.

For example, the modules can be configured with one or more integrated circuit to implement the above method, such as one or more ASIC, DSP, FPGA, etc. For another example, when a module functions by a processing unit invoking a program code, the processing unit can be general processing unit such as CPU or other. For another example, the modules can be integrated and invoked by SOC.

In addition, it should also be noted that, through the description of the above implementations, those skilled in the art can clearly understand that part or all of the present application can be realized by means of software and in combination with necessary general-purpose hardware platforms. Based on this, the present application further provides a computer storage medium which stores at least one program that executes any monitoring method for a mobile target mentioned above when the program is invoked. The monitoring method for a mobile target is referred in FIG. 1 and its related description, and is not described here. It should be noted that the computer program code can be source code, object code, executable file or some intermediate form, etc.

Based on this understanding, the technical solutions of the present application essentially or the part contributing to the prior art can be embodied in the form of a software product, the computer software product can include one or more machine readable media which store machine executable instructions thereon, when these instructions are executed by one or more machines such as a computer, a computer network or other electronic apparatus, such one or more machines can execute operations based on the embodiments of the present application. The machine readable media include but are not limited to, any entity or device capable of carrying the computer program code, a recording medium, a U disk, a mobile hard disk, a computer memory, a floppy disk, an optical disk, a CD-ROM (a compact disc-read only memory), a magnetic optical disc, an ROM (read-only memory), an RAM (random access memory), an EPROM (erasable programmable read-only memory), an EEPROM (electrically erasable programmable read-only memory), a magnetic card or optical card, a flash memory, an electric carrier signal, a telecommunication signal and a software distribution media or other types of media/machine readable media which are applicable to storing machine executable instructions. It should be noted that, the machine readable media can be different according to the related legislation and patent law in different jurisdictions. For instance, in some jurisdiction, an electric carrier signal or a telecommunication signal is not included in the computer readable media. Wherein the storage media can be located in the mobile robot and can also be located in a third-party server, for example, in a server providing a certain application store. Specific application stores are not limited herein, and can be a MIUI application store, a Huawei application store, and an Apple application store, etc.

Figure 16:
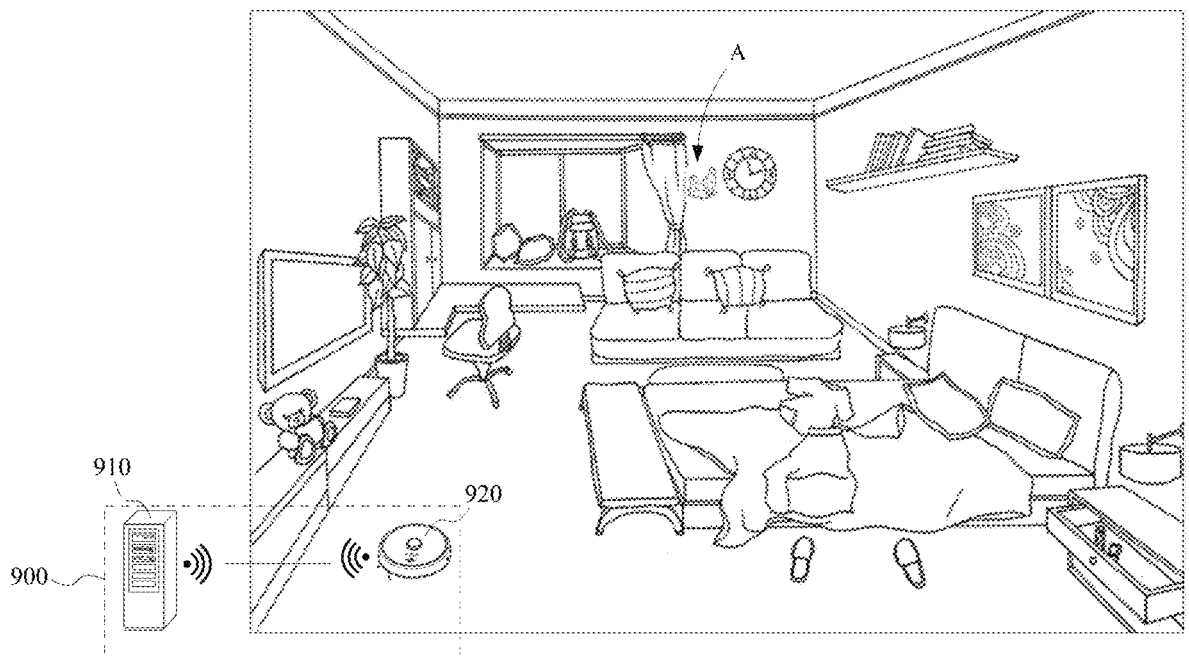
FIG. 16 shows a composition diagram of a monitoring system of the present application in one embodiment.

Please refer to FIG. 16 which shows a structural schematic diagram of a monitoring system of the present application in one embodiment. The monitoring system 900 includes a cloud server 910 and a mobile robot 920, and the mobile robot 920 is in communication with the cloud server 910. The mobile robot 920 includes an image acquisition device and a movement device. The mobile robot 920 moves in a three-dimensional space shown in FIG. 16, and a mobile target butterfly A exists in the mobile space shown in FIG. 16. During movement of the mobile robot 920 through a movement device, the mobile robot 920 captures multiple-frame images, selects two-frame images from the multiple-frame images and compares the two-frame images, and outputs a mobile target which moves relative to a static target. The selected two-frame images are for example the first frame image as shown in FIG. 6 and the second frame image as shown in FIG. 7. The first frame image and the second frame image have an image overlapped region shown by a dotted box in FIG. 6 and FIG. 7, and the image overlapped region corresponds to an overlapped field of view of the image acquisition device at the first position and the second position. Moreover, there are multiple static targets in the overlapped field of view of the image acquisition device, for example, chair, window, book shelf, clock, sofa, bed, and so on. In FIG. 6, a butterfly A is located at a left side of a clock, while in FIG. 7, the butterfly A is located at a right side of the clock, and the image comparison is performed on the first frame image and the second frame image to obtain a suspected target which moves relative to the static target. The method for image comparison for example can be referred to FIG. 5 and related description of FIG. 5, that is, the processing device of the mobile robot 920 obtains the movement information of the mobile robot 920 during the image acquisition device captures the first frame image and the second frame image, compensates the first frame image or the second frame image according to the movement information, and performs difference subtraction between the compensated image and the other original image to obtain a suspected target (butterfly A) with a regional moving track (from a left side of the clock to a right side of the clock). As to the method for image comparison, for another example, a manner of feature comparison as shown in FIG. 10 is referred to, wherein each feature point in the first frame image and the second frame image is extracted, and each feature point extracted from the two-frame images is matched on a reference three-dimensional coordinate system, wherein the reference three-dimensional coordinate system is formed through modeling a mobile space shown in FIG. 16. The processing device of the mobile robot 920 detects a feature point set, constituted by corresponding feature points which are not matched on the reference three-dimensional coordinate system, in the two-frame images to be a suspected target. Further, according to multiple-frame images which are acquired subsequently, the suspected target is tracked to acquire a continuous moving track of the suspected target and determine the suspected target (butterfly A) to be a mobile target (butterfly A). Further, according to the method shown in FIG. 8 or FIG. 11, the suspected target is tracked to obtain a moving track of the suspected target, and when the moving track of the suspected target is continuous, the suspected target is determined to be a mobile target. In the present embodiment, through tracking a butterfly A which serves as a suspected target, a continuous moving track of the butterfly A is obtained, for example, the butterfly A moves from a left side of the clock to a right side of the clock, and then moves to a head of the bed.

Training of the object recognizer and object recognition based on the object recognizer both involve a complex calculating process, which means huge calculating quantity and a high requirement on hardware of device which contains and runs the object recognizer. In some embodiments, the mobile robot 920 uploads images or videos containing the mobile target to the cloud server 910, and the mobile robot 920 outputs monitoring information according to results of object recognition of the mobile target received from the cloud server 910. The object recognition process for example includes recognizing images and videos containing the mobile target through preset image features, wherein the image feature can be for example image point feature, image line feature or image color feature. In the present embodiment, the mobile target is recognized as the butterfly A through detection on the contour of the butterfly A. The mobile robot 920 receives results of object recognition sent by the cloud server 910, and output monitoring information to a designated client according to the results of object recognition. The client can be for example electronic device with an intelligent data processing function such as a smart phone, a tablet computer, a smart watch and so on. Or for example, the cloud server 910 performs the object recognition to obtain a result of object recognition, and outputs monitoring information to the designated client according to the result directly. In the present embodiment, the cloud server 910 performs object recognition on the received images or videos containing images, and sends the results of object recognition to the mobile robot 920.

Due to the detection and recognition operations of a mobile target are performed on the cloud server, operating pressure of a local mobile robot can be lowed, requirements on hardware of the mobile robot can be reduced, and execution efficiency of the mobile robot can be improved;

moreover, strong processing functions of a cloud server can be sufficiently used, thereby enabling the implementation of the methods to be more rapid and accurate.

When more data processing programs are executed at a cloud, requirements on hardware of the mobile robot itself will be further lowered. When running programs need to be revised and updated, running programs in the cloud can be directly revised and updated conveniently, thereby improving efficiency and flexibility of system updating. Therefore, in some other embodiments, the mobile robot 920 captures multiple-frame images under a moving state and uploads them to the cloud server 910; and the cloud server 910 selects two-frame images from the multiple-frame images and compares the two-frame images, wherein the selected two-frame images are for example the first frame image as shown in FIG. 6 and the second frame image as shown in FIG. 7. The first frame image and the second frame image have an image overlapped region shown by a dotted box in FIG. 6 and FIG. 7, and the image overlapped region corresponds to an overlapped field of view of the image acquisition device at the first position and the second position. Moreover, there are multiple static targets in the overlapped field of view of the image acquisition device, for example, chair, window, book shelf, clock, sofa, bed, and so on. In FIG. 6, a butterfly A is located at a left side of a clock, while in FIG. 7, the butterfly A is located at a right side of the clock, and the image comparison is performed on the first frame image and the second frame image to obtain a suspected target which moves relative to the static target. The method for image comparison for example can be referred to FIG. 5 and related description of FIG. 5, that is, the processing device of the mobile robot 920 obtains the movement information of the mobile robot 920 during the image acquisition device captures the first frame image and the second frame image, compensates the first frame image or the second frame image according to the movement information, and performs difference subtraction between the compensated image and the other original image to obtain a suspected target (butterfly A) with a regional moving track (from a left side of the clock to a right side of the clock). As to the method for image comparison, for another example, a manner of feature comparison as shown in FIG. 10 is referred to, wherein each feature point in the first frame image and the second frame image is extracted, and each feature point extracted from the two-frame images is matched on a reference three-dimensional coordinate system, wherein the reference three-dimensional coordinate system is formed through modeling a mobile space shown in FIG. 16. The processing device of the mobile robot 920 detects a feature point set, constituted by corresponding feature points which are not matched on the reference three-dimensional coordinate system, in the two-frame images to be a suspected target. Further, according to multiple-frame images which are acquired subsequently, the suspected target is tracked to acquire a continuous moving track of the suspected target and determine the suspected target (butterfly A) to be a mobile target (butterfly A). The first frame image and the second frame image are compared according to the method of difference subtraction on a compensated image as shown in FIG. 5 or according to the method of feature comparison as shown in FIG. 10, to obtain a suspected target (butterfly A) which moves relative to the static target (for example, a clock). Further, according to the method shown in FIG. 8 or FIG. 11, the suspected target is tracked to obtain a moving track of the suspected target, and when the moving track of the suspected target is continuous, the suspected target is determined to be a mobile target. In the present embodiment, through tracking a butterfly A which serves as a suspected target, a continuous moving track of the butterfly A is obtained, for example, the butterfly A moves from a left side of the clock to a right side of the clock, and then moves to a head of the bed. Moreover, after performing object recognition on the mobile target, the cloud server 910 sends the recognized results to the mobile robot 920.

The mobile robot 920 can receive results of object recognition sent by the cloud server 910, and output monitoring information to a designated client according to the results of object recognition. The client can be for example electronic device with an intelligent data processing function such as a smart phone, a tablet computer and a smart watch. Or for example, the cloud server 910 performs the object recognition to obtain a result of object recognition, and outputs monitoring information to the designated client according to the result directly.

In some other embodiments, the mobile robot 920 further communicates with designated client through a mobile network, and the client can be for example electronic device with an intelligent data processing function such as a smart phone, a tablet computer and a smart watch.

The monitoring method and device for a mobile target, the monitoring system and mobile robot of the present application have the following beneficial effects: through the technical solution that acquiring multiple-frame images captured by an image acquisition device under an moving state of a robot in a monitored region, selecting at least two-frame images with an overlapped region from the multiple-frame images, performing comparison between the selected images by image compensation method or feature matching method, and outputting monitoring information containing a mobile target which moves relative to a static target based on the result of comparison, and wherein the position of the mobile target in each of the at least two-frame images has an attribute of indefinite change, the mobile target in the monitored region can be recognized precisely during movement of the mobile robot, and monitoring information about the mobile target can be generated to prompt correspondingly, thereby safety of the monitored region can be effectively ensured.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

The invention claimed is:

1. A monitoring device for a mobile target, used in a mobile robot, the mobile robot comprises a movement device and an image acquisition device, wherein, the monitoring device for a mobile target comprises:
at least one processing device;
at least one storage device, configured to store images captured by the image acquisition device under an operating state of the movement device;
at least one program, wherein the at least one program is stored in the at least one storage device, and is invoked by the at least one processing device such that the monitoring device performs a monitoring method for a mobile target;
the monitoring method for a mobile target comprises the following steps:
acquiring multiple-frame images captured by the image acquisition device under the operating state of the movement device;
performing comparison between at least two-frame images selected from the multiple-frame images, comprising: detecting a suspected target based on a matching operation on corresponding feature information in the at least two-frame images; and tracking the suspected target to determine the mobile target; and
outputting monitoring information containing a mobile target which moves relative to a static target according to a result of performing comparison between at least two-frame images selected from the multiple-frame images; wherein the at least two-frame images are images captured by the image acquisition device within partially overlapped field of view, and a position of the mobile target in each of the at least two-frame images has an attribute of indefinite change.

2. The monitoring device for a mobile target of claim 1, wherein the step of detecting a suspected target based on a matching operation on corresponding feature information in the at least two-frame images comprises the following steps:
extracting each feature point in the at least two-frame images respectively, and matching extracted each feature point in the at least two-frame images with a reference three-dimensional coordinate system; wherein the reference three-dimensional coordinate system is formed through performing three-dimensional modeling on a mobile space, and the reference three-dimensional coordinate system is marked with coordinate of each feature point on all static targets in the mobile space; and
detecting a feature point set as the suspected target, the feature point set is composed of feature points in the at least two-frame images that are not matched with the reference three-dimensional coordinate system.

3. The monitoring device for a mobile target of claim 1, wherein the step of tracking the suspected target to determine the mobile target comprises the following steps:
obtaining a moving track of a suspected target through tracking the suspected target; and
determining the suspected target as the mobile target when the moving track of the suspected target is continuous.

4. The monitoring device for a mobile target of claim 1, further comprising the following steps:
performing object recognition on the mobile target in the captured images, wherein the object recognition is performed by an object recognizer, the object recognizer includes a trained neural network; and
outputting the monitoring information according to result of the object recognition.

5. The monitoring device for a mobile target of claim 1, further comprising the following steps:
uploading captured images or videos containing images to a cloud server to perform object recognition on the mobile target in the image; wherein the cloud server includes an object recognizer which includes trained neural networks; and
receiving a result of object recognition from the cloud server and outputting the monitoring information.

6. The monitoring device for a mobile target of claim 1, wherein the monitoring information comprises one or more of image information, video information, audio information and text information.

7. A mobile robot, comprising:
a movement device, configured to control movement of the mobile robot according to received control instruction;
an image acquisition device, configured to capture multiple-frame images under an operating state of the movement device; and
a monitoring device, the monitoring device comprises:
at least one processing device;
at least one storage device, configured to store images captured by the image acquisition device under an operating state of the movement device;
at least one program, wherein the at least one program is stored in the at least one storage device, and is invoked by the at least one processing device such that the monitoring device performs a monitoring method for a mobile target; the monitoring method for a mobile target comprises the following steps:
acquiring multiple-frame images captured by the image acquisition device under the operating state of the movement device;
performing comparison between at least two-frame images selected from the multiple-frame images, comprising: detecting a suspected target based on a matching operation on corresponding feature information in the at least two-frame images; and tracking the suspected target to determine the mobile target; and
outputting monitoring information containing a mobile target which moves relative to a static target according to a result of performing comparison between at least two-frame images selected from the multiple-frame images; wherein the at least two-frame images are images captured by the image acquisition device within partially overlapped field of view, and a position of the mobile target in each of the at least two-frame images has an attribute of indefinite change.

8. A monitoring system, comprising:
a cloud server; and
a mobile robot, connected with the cloud server;
wherein the mobile robot performs the following steps:
acquiring multiple-frame images during movement of the mobile robot; outputting detection information containing a mobile target which moves relative to a static target according to a result of performing comparison between at least two-frame images selected from the multiple-frame images; uploading the captured images or videos containing images to the cloud server based on the detection information; and outputting monitoring information based on a result of object recognition received from the cloud server;

or, wherein the mobile robot performs the following steps: acquiring multiple-frame images during movement of the mobile robot, and uploading the multiple-frame images to the cloud server; and the cloud server performs the following steps: outputting detection information containing a mobile target which moves relative to a static target according to a result of performing comparison between at least two-frame images selected from the multiple-frame images; and outputting an object recognition result of the mobile target to the mobile robot according to a result of performing object recognition on the mobile target in multiple-frame images, such that the mobile robot outputs monitoring information;

wherein, the step of performing comparison between at least two-frame images selected from the multiple-frame images comprises: detecting a suspected target based on a matching operation on corresponding feature information in the at least two-frame images; and tracking the suspected target to determine the mobile target.

\* \* \* \* \*